United States Patent [19]
Kato et al.

[11] Patent Number: 5,157,321
[45] Date of Patent: Oct. 20, 1992

[54] CHARGING CONTROL APPARATUS FOR VEHICLE

[75] Inventors: Hidetoshi Kato, Suzuka; Hiroshi Shibata, Kariya; Tooru Aoyama, Okazaki; Kouji Tanaka, Anjo, all of Japan

[73] Assignee: Nippondenso Co., Ltd., Kariya, Japan

[21] Appl. No.: 428,310

[22] Filed: Oct. 30, 1989

Related U.S. Application Data

[63] Continuation-in-part of Ser. No. 342,930, Apr. 25, 1989, abandoned.

[30] Foreign Application Priority Data

Apr. 26, 1988 [JP] Japan .................. 63-103170
Jul. 27, 1989 [JP] Japan .................. 1-194546

[51] Int. Cl.$^5$ ........................................... H02J 7/24
[52] U.S. Cl. ............................................. 322/28; 322/8; 322/73; 320/64
[58] Field of Search .................. 322/8, 28, 73; 320/64

[56] References Cited

U.S. PATENT DOCUMENTS

| | | | |
|---|---|---|---|
| 4,459,489 | 7/1984 | Kirk et al. | 322/8 X |
| 4,590,414 | 5/1986 | Mayumi et al. | 320/64 |
| 4,602,205 | 7/1986 | Matsuhashi et al. | 320/64 |
| 4,636,706 | 1/1987 | Bowman et al. | 322/28 |

FOREIGN PATENT DOCUMENTS

| | | |
|---|---|---|
| 0009895 | 4/1980 | European Pat. Off. . |
| 0201243 | 12/1986 | European Pat. Off. . |
| 0229482 | 7/1987 | European Pat. Off. . |
| 60-35925 | 2/1985 | Japan . |
| 60-87636 | 5/1985 | Japan . |
| 61-247238 | 11/1986 | Japan . |
| 62-95935 | 5/1987 | Japan . |
| 62-152400 | 7/1987 | Japan . |
| 63-137542 | 9/1988 | Japan . |

*Primary Examiner*—R. J. Hickey
*Attorney, Agent, or Firm*—Cushman, Darby & Cushman

[57] ABSTRACT

In a charging control apparatus for a vehicle for controlling generation of electric power from a vehicle's generator charging a battery, the rate of increase in the field current of the generator is increased when an electrical load is connected to the generator. A switch is connected in series with the field winding, and a mean conduction rate detector detects the mean conduction rate of the switch and generates an output signal having a value which is a function of the mean conduction rate of the switch. A maximum signal generator generates an output signal having a value larger by a predetermined value than that of the output signal of the mean conduction rate detector, and a comparator is enabled to operate while the maximum signal generator is generating the maximum signal. The comparator is preferably enabled again when the value of the mean output signal of the conduction rate detector exceeds a preset value. The predetermined value is preferably increased with the increase in the mean conduction rate of the switch. By enabling the comparator operate depending on the value of the maximum signal, the mean conduction rate of the switch can be gradually increased after it is increased by a predetermined value. The comparator is enabled when the value of the output signal of the mean conduction rate detector attains preset value, and the battery can be quickly charged when the mean conduction rate exceeds the preset value. Because the predetermined value is increased with an increase in the mean conduction rate, the battery can be quickly charged according to the mean conduction rate while decreasing the burden on the engine.

8 Claims, 15 Drawing Sheets

CHARGING CONTROL APPARATUS FOR VEHICLE

CROSS-REFERENCE OF RELEVANT PATENT APPLICATIONS

The present application is a continuation-in-part application of U.S. Ser. No. 342,930 entitled Charging Control Apparatus for Vehicle filed on Apr. 25, 1989, now abandoned.

BACKGROUND OF THE INVENTION

This invention relates to a charging control apparatus for a vehicle for controlling generation of electric power from a vehicle's a.c. generator charging a battery. and more particularly to an apparatus of the kind described above which controls a field current of the generator so as to control the rate of increase in the field current when an electrical load is connected to the generator.

A charging control apparatus for a vehicle is disclosed in JP-A-59-83600 (corresponding to U.S. Pat. No. 4,459,489). According to the disclosed charging control apparatus, the fact that the output voltage of a vehicle's generator driven by an engine has dropped to a predetermined level (0.5 V) as a result of connection of a large electrical load to the generator is detected, and, in response to the detection of the voltage drop, the ratio of current having been supplied to the field winding of the generator before the connection of the electrical load is gradually increased. By so gradually increasing the field current of the generator, the load of the generator is gradually applied to the engine, so that the engine can be prevented from vibration or stalling.

This prior art charging control apparatus requires a first capacitor for detecting the mean conduction rate of the current supplied to the field winding of the generator, and a second capacitor to which the charge of the first capacitor is transferred when the drop of the output voltage of the generator to the predetermined level is detected. The voltage charged in the second capacitor is discharged through a resistor, and the output of the resistor is compared with a triangular waveform voltage to generate a signal used to gradually increase the current supply ratio up to 100%. The period of time required for gradually increasing the current supply ratio up to 100% is determined by the time constant given by the product of the capacitance of the second capacitor and the resistance of the resistor. Therefore, when the time constant of about several seconds is desired, the required capacitance value of the second capacitor is larger than a predetermined value (about 1 μF). Also, the required capacitance value of the first capacitor is about ten times as large as that of the second capacitor in view of the requirement for transferring the charge of the first capacitor into the second capacitor.

Thus, large capacities are required for the first and second capacitors, resulting in a large size of the charging control apparatus. In other words, ceramic capacitors are required to act as these capacitors, and the first and second capacitors cannot be integrated into a hybrid IC together with other control elements.

Further, the prior art charging control apparatus requires comparing means including a capacitor, a resistor and a comparator so as to detect a drop of the output voltage of the generator due to connection of an electrical load, and this results inevitably in a large size of the apparatus.

SUMMARY OF THE INVENTION

It is an object of the present invention to provide a charging control apparatus for a vehicle in which the conduction rate of current supplied to the field winding of the vehicle's generator can be gradually increased without increasing the size of the apparatus.

Another object of the present invention is to provide a charging control apparatus for a vehicle in which discharge of the vehicle's battery can be minimized while, at the same time, preventing the engine from vibration or stalling.

In the following description, terms "conduction rate" and "turned-off ratio" are used to designate the percentages of lengths of time during which a switching element is kept turned on and turned off respectively in one period.

In accordance with one aspect of the present invention, there is provided a charging control apparatus for a vehicle comprising a vehicle's a.c. generator including a stator winding and a field winding and driven by an engine to generate on output voltage for charging a battery, switching means connected in series with the field winding, conduction rate detecting means for detecting the conduction rate of the switching means to generate an output signal having a value which is a function of the conduction rate of the switching means, maximum signal generating means for generating a maximum signal having a value larger by a predetermined value than that of the output signal of the conduction rate detecting means, comparing means receiving the output voltage of the vehicle's a.c. generator as an input for comparing this output voltage with a predetermined reference voltage applied as the other input, thereby controlling the switching means on the basis of the result of comparison, and enable control means for enabling the comparing means to generate its output signal depending on the value of the maximum signal generated from the maximum signal generating means.

In the charging control apparatus of the present invention, it is preferable to enable the comparing means again when the value of the output signal of the conduction rate detecting means exceeds a set value.

Also, in the charging control apparatus of the present invention, it is preferable that the predetermined value in the maximum signal generated from the maximum signal generating means is increased with the increase in the conduction rate detected by the conduction rate detecting means.

Thus, by enabling the comparing means depending on the value of the maximum signal generated from the maximum signal generating means, the conduction rate of the switching means can be gradually increased after it is increased by a predetermined value.

The comparing means is enabled when the value of the output signal of the conduction rate detecting means exceeds its setting. Therefore, the battery can be quickly charged when the conduction rate exceeds the set value.

Also, because the predetermined value in the maximum signal generated from the maximum signal generating means is increased with the increase in the conduction rate detected by the conduction rate detecting means, the battery can be quickly charged according to the conduction rate while decreasing the burden on the engine.

It is an additional object of the present invention to eliminate engine-stall which may be caused by an alternator operating as the load of the engine when the revolutions of an engine remain at a low level.

To obtain this object, according to the present invention, a predetermined increasing conduction rate is detected and the conduction rate of a field-current is controlled gradually.

Further, according to the present invention, a predetermined quantity of the electrical-load on operation condition is detected based on the predetermined increasing quantity of the conduction rate. Therefore, a smaller electrical-load may be detected as the rotational speed of the engine remains at a low level. Namely, the degree of increase of the conduction rate is large as the rotational speed of the engine remains at a low level when a constant electrical-load is held. Accordingly, a larger electrical-load is detected as the rotation speed of the engine increases to higher level; gradual control will not be needed concerning a smaller electrical-load when the revolutions of the engine remains at a high level, therefore it is advantageous and sufficient to charge the battery according to the above results.

A still further object of the present invention is to provide a charging control apparatus for vehicles which is capable of preventing the vibration or stalling of the engine without increasing the size of the control apparatus.

In order to achieve the aforementioned object, according to the present invention, there is provided a charging control apparatus comprising a maximum signal generating means for producing a maximum signal larger by a predetermined value than a signal representing a conduction rate obtained from an integration circuit, and voltage control means operable during the output of the maximum signal.

Accordingly, if the conduction rate of the switching means is increased by a predetermined value as a result of application of an electrical load or a reduction in engine speed, the mean conduction rate of the integration circuit gradually increases accordingly, and with the gradual change in the maximum signal, the conduction rate of the switching means also increases slowly.

This positive feedback process (Increase in conduction rate of the switch means → increase in mean conduction rate of the integration circuit → Change in maximum signal → Increase in the conduction rate of the switching means) increases the conduction rate of the switching means steadily, and so the load on the generator increases, thereby preventing the engine from being subjected to a sharp increase in load.

This configuration has advantage, in that in view of the fact that the integration circuit is connected to the switching means with charge and discharge represented in accordance with turning on and off of the switch means, the capacity of the capacitor is reduced as compared with the conventional apparatuses using only the discharge of a capacitor, and that the detection circuit for applying an electrical load required for the conventional apparatuses (to decide whether the battery voltage has dropped by a predetermined value) is eliminated.

DESCRIPTION OF THE PREFERRED EMBODIMENTS

Preferred embodiments of the charging control apparatus for a vehicle according to the present invention will now be described in detail with reference to the drawings.

Figure 1:
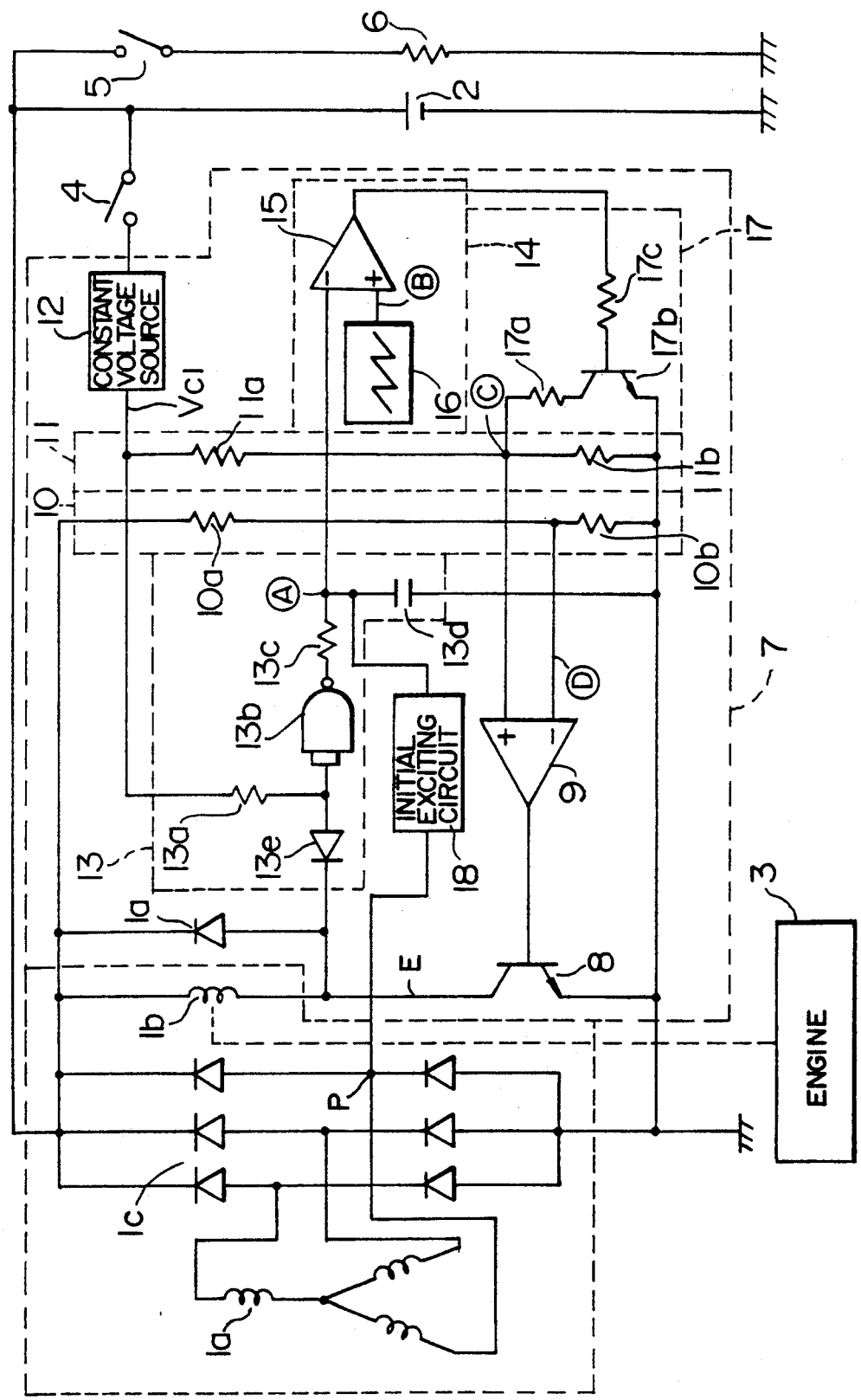
FIG. 1 is an electrical circuit diagram showing the structure of a first embodiment of the charging control apparatus for a vehicle according to the present invention.

FIG. 1 shows a first embodiment of the present invention. A vehicle's a.c. generator 1 includes three-phase stator windings 1a of Y-connection, a field winding 1b driven by an engine 3, and a full-wave rectifier 1c rectifying an a.c. output voltage appearing across the stator windings 1a. As is well known, the generator 1 is driven at a high speed from the engine 3 through a belt and pulley (not shown).

A battery 2 is connected at one of its terminals to the full-wave rectifier 1c and to a key switch 4. The battery 2 is grounded at the other terminal. A changeover switch 5 disconnectably connects an electrical load 6 to the battery 2.

A control circuit 7 controls field current supplied to the field winding 1b of the generator 1. Such a control circuit 7 is well known from the disclosures of, for example, U.S. Pat. Nos. 3,538,361 and 4,419,597 and is mounted on the vehicle's a.c. generator 1.

The structure of the control circuit 7 employed in the present invention will now be described in detail. The control circuit 7 includes an output transistor 8 which is a switching means connected in series with the field winding 1b of the generator 1 to control field current supplied to the field winding 1b. A comparator 9 is a comparing means which is provided for controlling the output transistor 8.

A voltage detection circuit 10 is connected to the full-wave rectifier 1c in the generator 1 to detect the output voltage of the generator 1. This voltage detection circuit 10 includes a first resistor 10a and a second resistor 10b. The connection point ⒟ between the first and second resistors 10a and 10b is connected to a minus (−) input terminal of the comparator 9.

A constant voltage $V_{cl}$ generated from a constant-voltage regulated power supply 12 is divided by a third resistor 11a and a fourth resistor 11b of a reference voltage circuit 11. The connection point ⒞ between the third and fourth resistors 11a and 11b is connected to a plus (+) input terminal of the comparator 9.

A mean conduction rate detection circuit 13 is connected between the output transistor 8 and the field winding 1b of the generator 1. This mean conduction rate detection circuit 13 includes a series circuit of a fifth resistor 13a, a NAND gate 13b, a sixth resistor 13c and a capacitor 13d connected between the constant voltage source 12 and ground. The detection circuit 13 also includes a diode 13e connected between the fifth resistor 13a and the connection point between the output transistor 8 and the field winding 1b of the generator 1. When the output transistor 8 is in its on state, a low level appears between the diode 13e and the NAND gate 13b in the mean conduction rate detection circuit 13, and, due to this low level, an output of high level appears from the NAND gate 13b. Therefore, the capacitor 13d is charged through the sixth resistor 13c by the voltage of the constant voltage source 12.

On the other hand, when the output transistor 8 is in its off state, a high level appears between the diode 13e and the NAND gate 13b, and the voltage charged in the capacitor 13d is discharged through the sixth resistor 13c and the NAND gate 13b.

In the mean conduction rate detection circuit 13 of the charging control apparatus shown in FIG. 1, the sixth resistor 13c has a resistance value of about 1 MΩ, the capacitor 13d has a capacitance value of about 0.2 μF, and the time constant of the combination of the sixth resistor 13c and the capacitor 13d is about 200 msec.

Therefore, the voltage charged in the capacitor 13d as a result of charging and discharging the capacitor 13d due to turning on and turning off the output transistor 8 within the period of time of about 200 msec corresponds to the mean conduction rate of the output transistor 8.

A maximum signal generating circuit 14 includes a comparator 15 and a triangular wave generating circuit 16. This comparator 15 is connected at its minus (−) input terminal to the capacitor 13d in the mean conduction rate detection circuit 13 and at its plus (+) input terminal to the triangular wave generating circuit 16.

Figure 2:
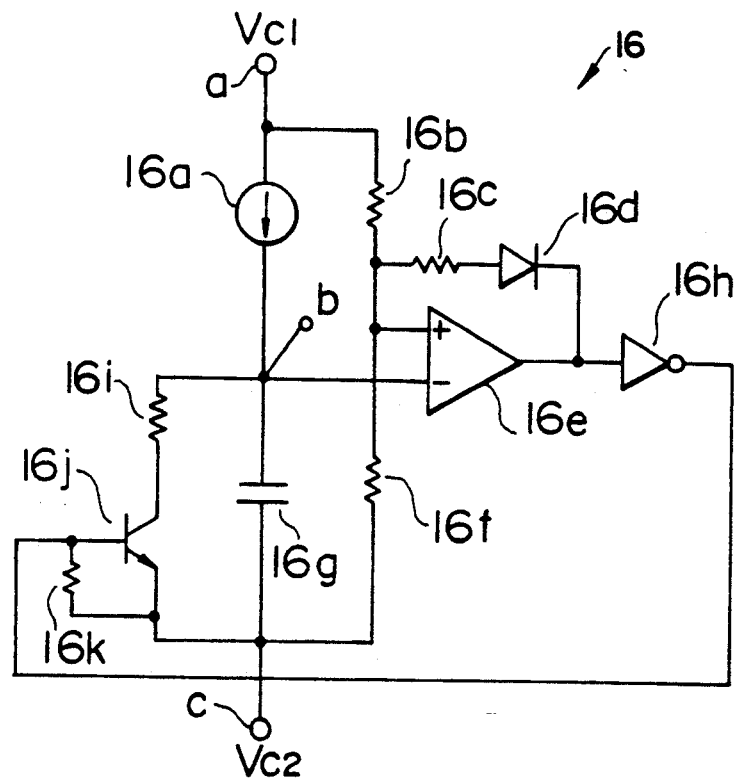
FIG. 2 is an electrical circuit diagram of the triangular wave generating circuit provided in the first embodiment shown in FIG. 1.

The triangular wave generating circuit 16 has a structure as shown in FIG. 2. In FIG. 2, a constant current source 16a and a capacitor 16g are connected in series between a terminal a connected to the constant voltage source 12 ($V_{cl}$) and a terminal c connected to a negative voltage source ($−V_{c2}$). A series connection of a first resistor 16b having a resistance value $R_1$ and a second resistor 16f having a resistance value $R_3$ is connected in parallel with the series connection of the constant current source 16a and the capacitor 16g. A comparator 16e is connected at its plus (+) input terminal to the connection point between the first and second resistors 16b and 16f and at its minus (−) input terminal to the connection point between the constant current source 16a and the capacitor 16g. A third resistor 16c having a resistance value $R_2$ is connected in series with a diode 16d between the output terminal and the plus (+) input terminal of the comparator 16e. A series connection of a transistor 16j and a fourth resistor 16i provided for protecting the transistor 16j is connected in parallel with the capacitor 16g, and an inverter 16h is connected between the base of the transistor 16j and the output terminal of the comparator 16e. The emitter and base of the transistor 16j are connected by a fifth resistor 16k. Another terminal b is connected to the plus (+) input terminal of the comparator 15.

Figure 4A:
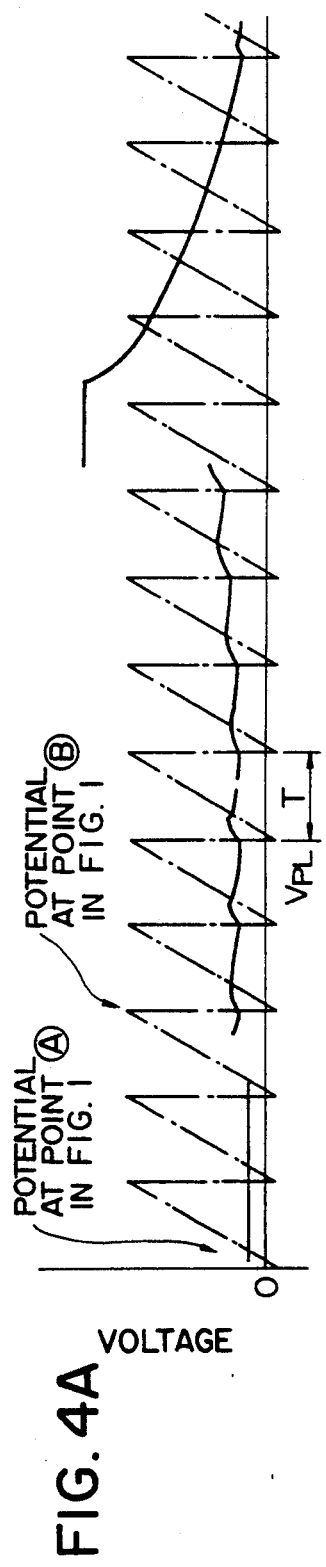
FIGS. 4A, 4B and 4C are waveform diagrams showing voltage waveforms appearing at various parts in FIG. 1.

The triangular wave generating circuit 16 generates an output voltage having a triangular waveform as shown in FIG. 4A. This triangular voltage waveform has a maximum value $V_{PH}$, a minimum value $V_{PL}$ and a period T, as follows:

$$V_{PH} = \frac{(V_{c1} - V_{c2}) \cdot R_3}{R_1 + R_3}$$

$$V_{PL} = \frac{(V_{c1} - V_{c2}) \cdot V_Z}{Z_1}$$

$$T = \frac{CV}{i}$$

where $$Z = R + \frac{R_2 R_3}{R_2 + R_3} ,$$

i is the constant current value of the constant current source, C is the capacitance value of the capacitor 16g, and $V = V_{PH} - V_{PL}$.

In the present invention, the minimum value $V_{PL}$ is selected to be 1/10 of the constant voltage $V_{cl}$ for the reason which will be described later. The period T is set at 20 msec.

An enable control circuit 17 in FIG. 1 includes a first resistor 17a and a transistor 17b connected in parallel with the fourth resistor 11b in the reference voltage circuit 11. The transistor 17b is connected at its base to the output terminal of the comparator 15 in the maximum signal generating circuit 14 through a second resistor 17c.

Figure 3:
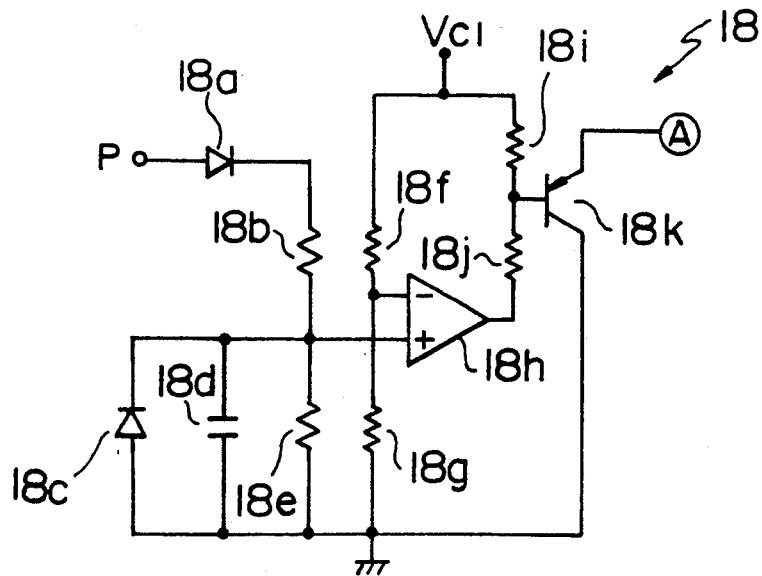
FIG. 3 is an electrical circuit diagram of the initial exciting circuit provided in the first embodiment shown in FIG. 1.

An initial exciting circuit 18 is connected between a terminal P (one phase of the stator windings 1a) and the connection point between the sixth resistor 13c and the capacitor 13d in the mean conduction rate detection circuit 13. This initial exciting circuit 18 has a structure as shown in FIG. 3. In FIG. 3, the initial exciting circuit 18 includes a diode 18a connected to the terminal P to detect the voltage appearing at the terminal P, a first resistor 18b, a second resistor 18e, and a Zener diode 18c and a capacitor 18d connected in parallel with the second resistor 18e. The initial exciting circuit 18 further includes a comparator 18h connected at its minus (−) input terminal to the constant voltage source $V_{cl}$ through a third resistor 18f and at its plus (+) input terminal to the connection point between the first and second resistors 18h and 18e. The comparator 18h is connected at its output terminal to the constant voltage source $V_{cl}$ through a fourth resistor 18i and a fifth resistor 18j connected in series with each other. The initial exciting circuit 18 further includes an NPN transistor 18k connected at its emitter to the connection point Ⓐ between the sixth resistor 13c and the capacitor 13d in the mean conduction rate detection circuit 13, at its base to the connection point between the fourth and fifth resistors 18i and 18j, and at its collector to ground. A diode 19 is connected in parallel with the field winding 1b.

The operation of the charging control apparatus having the structure shown in FIG. 1 will now be described. At the time of turning on the key switch 4, the generator 1 is not in operation yet, and no voltage is applied to the plus (+) input terminal of the comparator 18h in the initial exciting circuit 18 shown in FIG. 3. Therefore, an output of low level appears from the output terminal of the comparator 18h, and the transistor 18k is turned on. As a result, the voltage at the point Ⓐ in the mean conduction rate detection circuit 13 is clamped at a predetermined level determined by the fourth and fifth resistors 18i and 18j in the initial exciting circuit 18.

In FIG. 4A, the predetermined voltage appearing at the point Ⓐ in FIG. 1 is indicated by the solid line, and the voltage generated from the triangular wave generating circuit 16 and appearing at the point Ⓑ in FIG. 1 has a triangular waveform as shown by the one-dot chain lines.

The predetermined voltage appearing at the point Ⓐ is applied to the minus (−) input terminal of the comparator 15 in the maximum signal generating circuit 14, and the triangular waveform voltage appearing at the point Ⓑ is applied to the plus (+) input terminal of the comparator 15. During the period of time in which the level of the predetermined voltage is higher than that of the triangular waveform voltage, an output of low level appears from the output terminal of the comparator 15, and the transistor 17b in the enable control circuit 17 is turned off. When this transistor 17b is turned off, the potential at the point Ⓒ in FIG. 1 increases.

The comparator 9 compares the potential at the point Ⓒ with that at the point Ⓓ in FIG. 1. When the output voltage of the generator 1 exceeds 14.5 V, the comparator 9 generates an output of low level. At the time of turning on the key switch 4, the output voltage of the generator 1 is low and, hence, the battery voltage is low, and the potential at the point Ⓒ is higher than that at the point Ⓓ. Therefore, the comparator 9 generates an output of high level, and the output transistor 8 is turned on. When the output transistor 8 is turned on, current is supplied to the field winding 1b of the generator 1, and the generator 1 starts to generate its a.c. output voltage across the stator windings 1a.

On the other hand, during the period of time in which the level of the predetermined voltage appearing at the point Ⓐ is lower than that of the triangular waveform voltage appearing at the point Ⓑ in FIG. 1, the comparator 15 generates its output of high level thereby turning on the transistor 17b in the enable control circuit 17. As a result, the potential at the point Ⓒ in FIG. 1 decreases.

In the normal state of the battery 2, the potential at the point Ⓓ in FIG. 1 is higher than that at the point Ⓒ, and the output transistor 8 is turned off through the comparator 9.

Therefore, the output transistor 8 is repeatedly turned on and off depending on the high and low levels of the output of the comparator 15 in the maximum signal generating circuit 14. Commonly, the output transistor 8 is turned on and off to operate with the conduction rate of 20%. That is, in the initial starting stage of the generator 1, the conduction rate is determined on the basis of the predetermined voltage appearing at the point Ⓐ in FIG. 1, that is, the voltage determined by the fourth and fifth resistors 18i and 18j in the initial exciting circuit 18.

While the output transistor 8 is being controlled to operate with the conduction rate of 20%, the output voltage of the generator 1 increases until a voltage exceeding the predetermined value appears at the terminal P. When such a voltage is applied from the terminal P to the initial exciting circuit 18 shown in FIG. 3, the comparator 18h generates its output of high level thereby turning off the transistor 18k. Therefore, the potential at the point Ⓐ in FIG. 1 is now determined the potential of the capacitor 13d in the mean conduction rate detection circuit 13 instead of the predetermined voltage determined by the resistors 18i and 18j in the initial exciting circuit 18.

The operation of the charging control apparatus under a constant light-loaded condition between time $t_1$ and time $t_2$ shown in FIGS. 4A to 4C will now be described.

It is generally supposed that, when the engine 3 is idling, the conduction rate of the output transistor 8 is stabilized at about 30% in relation to the normal load applied to the battery 2.

When the output transistor 8 is in its on state, the constant voltage source 12 connected to the mean conduction rate detection circuit 13 charges the capacitor 13d through the NAND gate 13b and the sixth resistor 13c. On the other hand, when the output transistor 8 is in its off state, the voltage charged in the capacitor 13d is discharged through the sixth resistor 13c and the NAND gate 13b. Thus, the voltage charged in the capacitor 13d is determined depending on the conduction rate of the output transistor 8. For example, when the conduction rate of the output transistor 8 is 100%, the voltage charged in the capacitor 13d is equal to the power supply voltage $V_{cl}$ of the constant voltage source 12, while when the conduction rate of the output transistor 8 is 0%, no voltage is charged in the capacitor 13d. The voltage charged in the capacitor 13d is applied to the minus (−) input terminal of the comparator 15 in the maximum signal generating circuit 14.

As will be seen in FIG. 4A, the minimum value of the triangular voltage waveform appearing at the point Ⓑ is negative, and, when the voltage charged in the capacitor 13d and appearing at the point A is 0 V, the comparator 15 generates its output of low level at a predetermined percentage of about 10%. That is, when the mean conduction rate of the output transistor 8 is 30% as shown in FIG. 4C, the output of the comparator 15 controls the transistor 17b so that the transistor 17b operates with a turned-off ratio of 40% as shown in FIG. 4B.

Figure 4B:
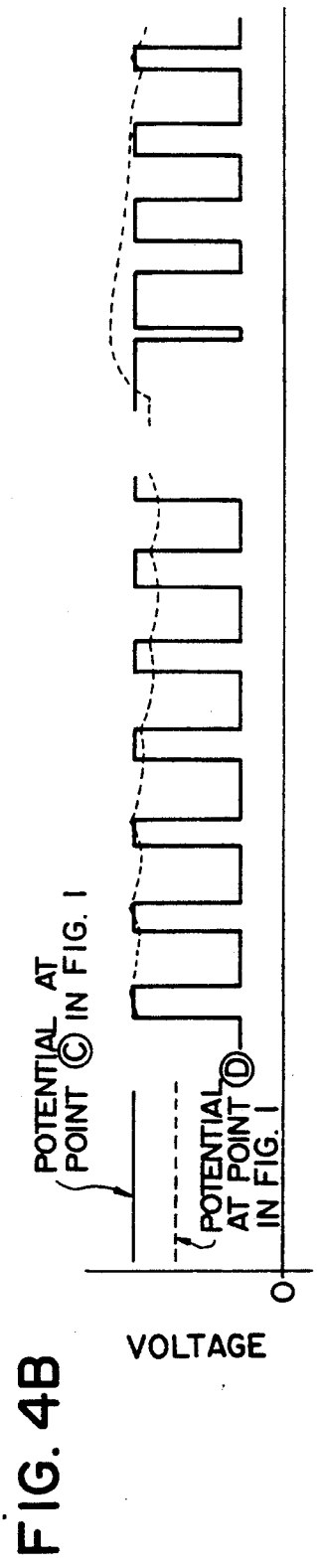

Therefore, when the potential at the point Ⓒ is in its high level as shown in FIG. 4B, that is, when the transistor 17b is controlled to operate with the turned-off ratio of 40%, the comparator 9 compares the output voltage of the generator 1 with the predetermined voltage level of 14.5 V.

When the apparatus is operating stably, and the transistor 17b is being controlled to operate with the turned-off ratio of 40%, the voltage of the battery 2 decreases to a level lower than 14.5 V for a period of 30%, and the comparator 9 generates its output of high level thereby turning on the output transistor 8. Thus, the output transistor 8 is controlled to operate with the conduction rate of 30%, and the voltage of the battery 2 is controlled to be maintained at 14.5 V.

The operation of the charging control apparatus from time $t_2$ to time $t_3$ in FIGS. 4A to 4C will now be described. At time $t_2$, the electrical load 6 shown in FIG. 1 is connected to the generator 1 by turning on the switch 5 while the apparatus is operating stably as described above.

When the transistor 17b is being controlled to operate with the turned-off ratio of 40% in the stably operating state of the apparatus, and the output transistor 8 is operating with the conduction rate of 30%, the potential at the point Ⓓ in FIG. 1 is higher than that at the point Ⓒ. However,. when the electrical load 6 is connected to the generator 1 by turning on the switch 5, the potential at the point Ⓓ is not higher than that at the point Ⓒ as shown in FIG. 4B. While the transistor 17b is in its turned-off state, the comparator 9 generates its output of high level thereby turning on the output transistor 8.

Thus, the output transistor 8 is now controlled to operate with the conduction rate of 40% in response to the application of the electrical load 6 although it had been controlled to operate with the conduction rate of 30%.

During the transistion of the conduction rate of the output transistor 8 from 30% to 40%, the voltage charged in the capacitor in the mean conduction rate detection circuit 13 increases too (The charged voltage increases because the time constant given by the combination of the sixth resistor 13c and the capacitor 13d has the large value of 200 msec.). Due to the increase in the charged voltage of the capacitor 13d, the percentage of the output of low level generated from the comparator 15 increases gradually from 40%. Therefore the turned-off ratio of the transistor 17b turned off in response to the low level output of the comparator 15 increases gradually from 40%, so that both the operable period of time of the comparator 9 and the conduction rate of the output transistor 8 can also be increased.

Figure 4C:
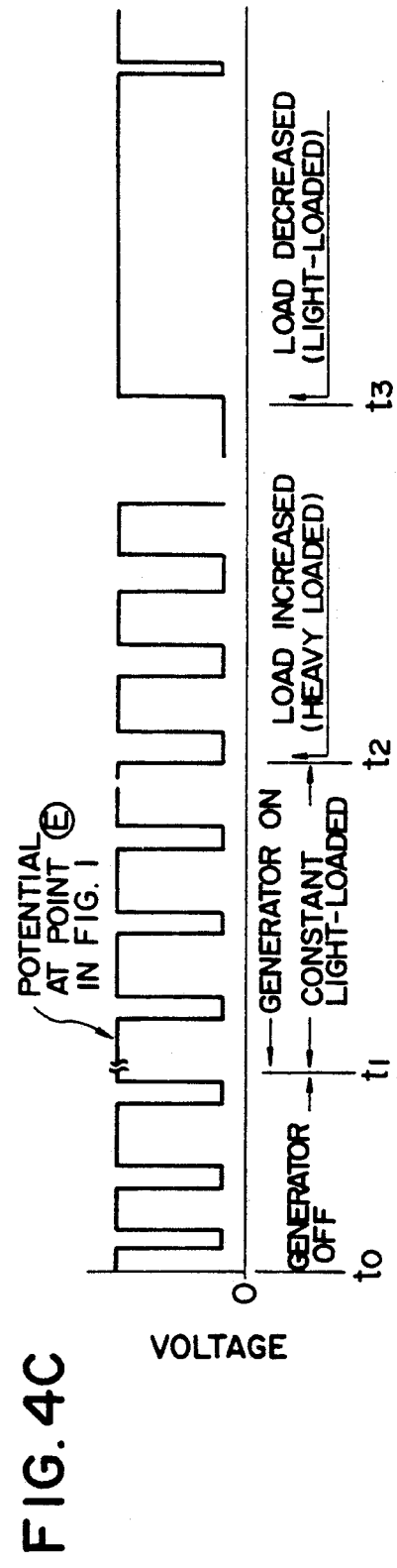
Figure 5:
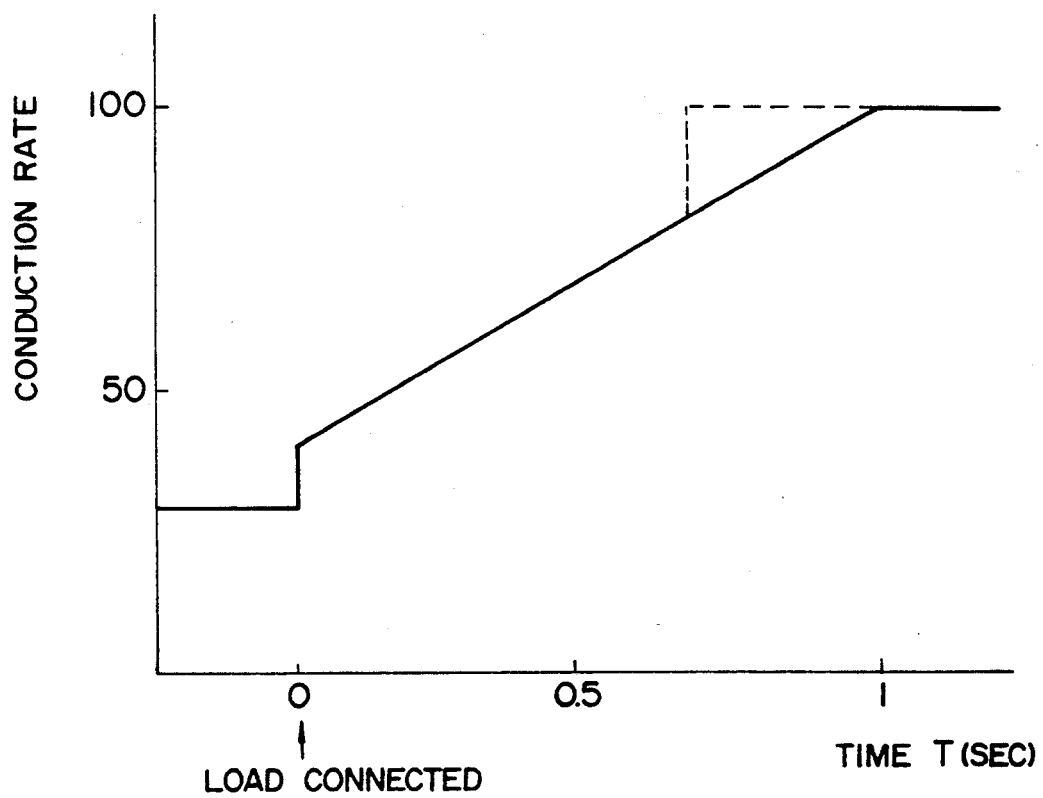
FIG. 5 shows how the conduction rate changes with time after application of an electrical load in the first embodiment shown in FIG. 1.

Thus, as shown in FIGS. 4C and 5, the conduction rate of the output transistor 8 increases from 30% to 40% when the electrical load 6 is connected to the generator 1 by turning on the switch 5 and then gradually increases up to 100% along the solid curve (In this case, the electrical load 6 is large enough to require the increase in the conduction rate up to 100%.).

In the aforementioned embodiment of the present invention, the conduction rate of the output transistor 8 is gradually increased from 40% to 100% within a period of time of 1 sec.

Suppose that the capacitor 13d in the mean conduction rate detection circuit 13 has a capacitance value of about 0.1 μF, and the time constant of the combination of the sixth resistor 13c and the capacitor 13d is about 1 sec.

In the aforementioned embodiment, the capacitor 13d is repeatedly charged and discharged according to the period of the voltage of triangular waveform generated from the triangular wave generating circuit 16, as shown in FIG. 4A. Therefore, even when the time constant of the combination of the sixth resistor 13c and the capacitor 13d is set at about 1 sec, the conduction rate of the output transistor 8 can be gradually increased from 40% to 100%, and the delay time can be set at about 3 sec.

Therefore, capacitor 13d can have a small capacitance value of about 0.1 μF can be used. Such a chip capacitor can be integrated in a substrate to form part of a hybrid IC. That is, the control circuit 7 can be integrated into a hybrid IC.

The prior art charging control apparatus includes means for detecting an increase in an electrical load, means (a capacitor) for detecting the current supply ratio of field current, an integrator circuit for gradually increasing the current supply ratio and a pulse width modulation circuit so as to deal with application of the electrical load. In contrast, in the case of the embodiment of the present invention, the mean conduction rate detection circuit 13 (including the sixth resistor 13c and the capacitor 13d) and the maximum signal generating circuit 14 (including the comparator 15 and the triangular wave generating circuit 16) only are required to deal with application of the electrical load 6, so that the size of the charging control apparatus can be correspondingly decreased.

Therefore, in the aforementioned embodiment of the present invention, the conduction rate of the output transistor 8 (hence, the field current of the generator 1) is not sharply increased but gradually increased when the electrical load 6 is connected by turning on the switch 5, so that the electrical load 6 can be gradually applied to the engine 3. Thus, undesirable vibration or stalling of the engine 3 due to abrupt application of the electrical load 6 can be reliably prevented.

The conduction rate of the output transistor 8 may be quickly increased from 30% to 40% when the electrical load 6 is applied. Even in such a case, vibration or stalling of the engine 3 would not occur because the rate of increase in the conduction rate of the output transistor 8 is not large. Further, when the conduction rate of the output transistor 8 is increased by 10% from 30% to 40% as described above, the period of time required to increase the conduction rate up to 100% can be decreased by several ten msec, so that insufficiency of charging the battery 2 can be quickly compensated.

Further, on the basis of the conduction rate detected by the mean conduction rate detection circuit 13, the corresponding output of the maximum signal generating circuit 14 is used to increase, by about 10%, the turned-off ratio of the transistor 17b in the enable control circuit 17. This is advantageous in that a margin can be provided for the conduction rate so as to permit a slight variation of the conduction rate due to, for example, a variation of the rotation speed of the engine 3.

The operation of the charging control apparatus after time $t_3$ in FIGS. 4A to 4C will now be described. At this time $t_3$, the electrical load 6 applied at time $t_2$ to cause the increase in the conduction rate of the output transistor 8 is disconnected by turning off the switch 5. When the electrical load 6 is disconnected while the output transistor 8 is being controlled to operate with the turned-off ratio of 100% (that is, while the transistor 17b is being controlled to operate with the turned-off ratio of 100%), the voltage of the battery 2 increases sharply, and, at the same time, the potential at the point Ⓓ in FIG. 1 increases as shown in FIG. 4B. As a result, the comparator 9 generates its output of low level thereby turning off the output transistor 8. In the state in which the electrical load 6 is disconnected, the output transistor 8 is maintained in its off state until the voltage of the battery 2 drops to a level lower than 14.5 V.

Also, in this first embodiment, the potential at the point Ⓒ is in its low level while the transistor 17b in the enable control circuit 17 is in its on state. It is so arranged that the potential at the point Ⓒ at that time becomes higher than that at the point Ⓓ when the voltage of the battery 2 decreases to a level lower than 12 V.

This voltage setting of 12 V is determined on the basis of a compensation voltage required for compensation of the load connected in parallel with the battery 2 or a voltage level required for preventing complete depletion of the voltage of the battery 2.

Therefore, in the event that the voltage of the battery 2 drops to a level lower than the setting of 12 V, the output transistor 8 is turned on through the comparator 9 to operate the generator 1 thereby preventing complete depletion of the voltage of the battery 2.

Further, because the control circuit 7 is mounted on the generator 1, it is exposed to or heated up to a temperature higher than 100° C. during operation. Therefore, a prior art digital circuit including an up/down counter can be hardly used to operate at such a high temperature because a circuit element such as a MOS device in the digital circuit is susceptible to heat. On the other hand, because of the use of bipolar transistors which can operate at a temperature higher than 100° C., the control circuit 7 in the embodiment of the present invention can sufficiently withstand high heat levels.

A second embodiment shown in FIG. 6 will next be described. This second embodiment is a modification of the first embodiment shown in FIG. 1, and an amplifier circuit 20 including an operational amplifier and resistors 20a, 20b is connected between the mean conduction rate detection circuit 13 and the maximum signal generator circuit 14 in the first embodiment.

In this amplifier circuit 20, the voltage of the capacitor 13d in the mean conduction rate detection circuit 13 is amplified by the factor of, for example, about 1.3 according to the resistance ratio between the resistors 20a and 20b, and such an amplified voltage is applied to the minus (−) input terminal of the comparator 15 in the maximum signal generator circuit 14.

Figure 6:
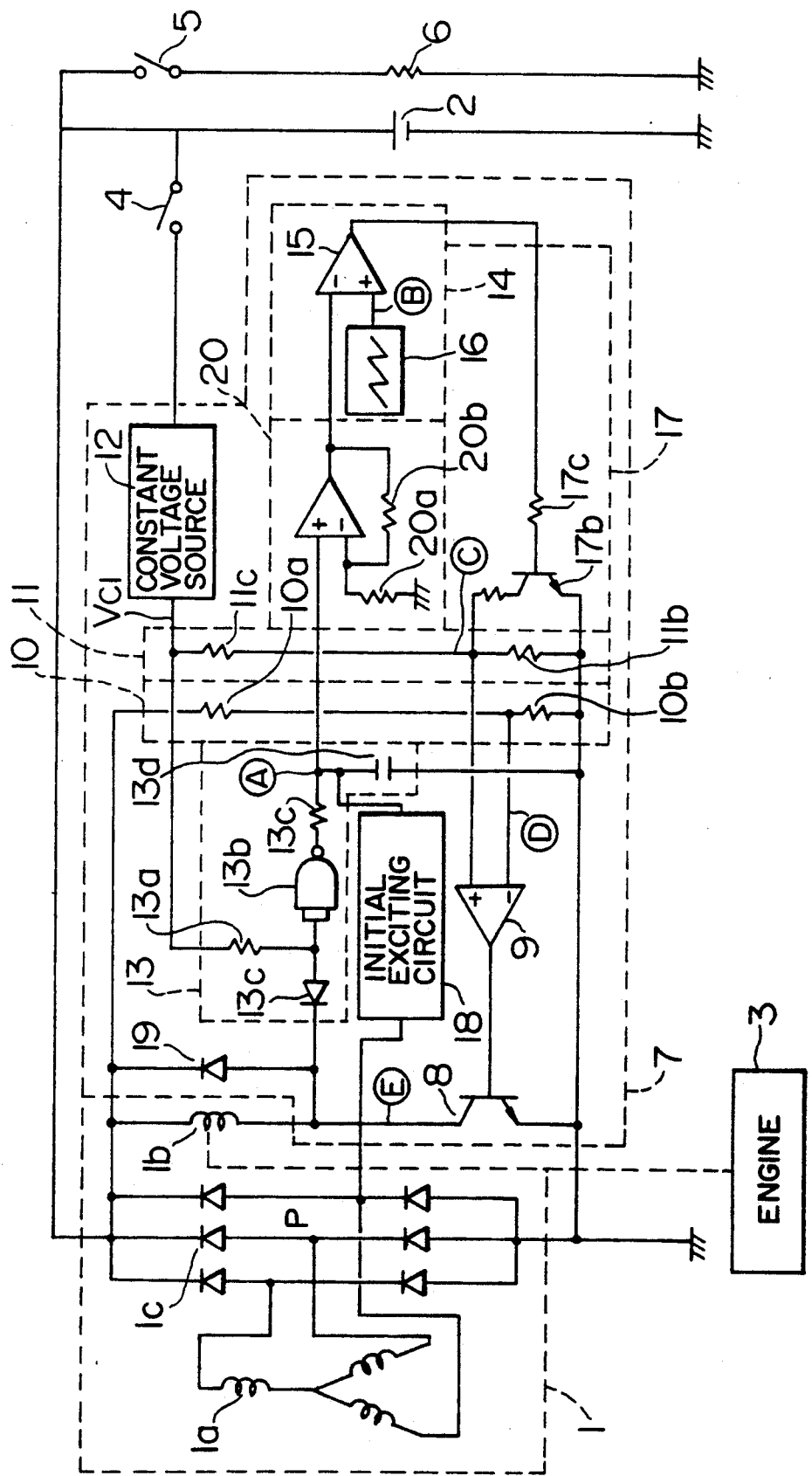
FIG. 6 is an electrical circuit diagram showing the structure of a second embodiment of the present invention.
Figure 7:
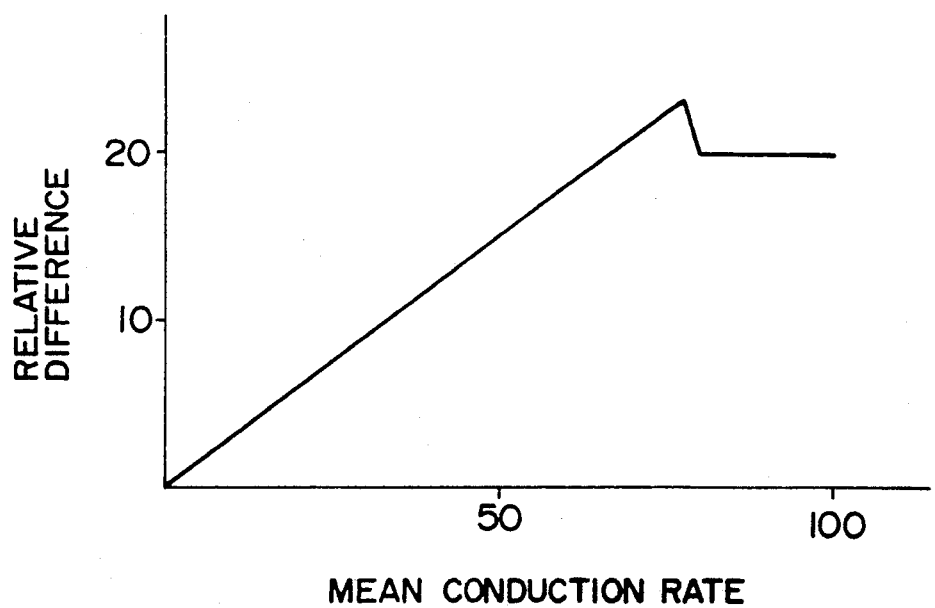
FIG. 7 shows the relation between the mean conduction rate and the relative difference in the second embodiment shown in FIG. 6.

In the second embodiment shown in FIG. 6, the amplifier circuit 20 is provided so that the relative difference between the mean conduction rate of the output transistor 8 detected by the mean conduction rate detection circuit 13 and the conduction rate of the transistor 17b in the enable control circuit 17 increases with the increase in the mean conduction rate as shown in FIG. 7.

Therefore, when the electrical load 6 is connected while the mean conduction rate is small, the rate of rise of the conduction rate shown in FIG. 5 (the relative difference shown in FIG. 7) at the time of the connection of the electrical load 6 is small. On the other hand, when the electrical load 6 is connected while the mean conduction rate is large, the rate of rise of the conduction rate is large.

That is, because the torque of the engine 3 driving the generator 1 is small when the mean conduction rate is small, undesirable vibration of the engine 3 tends to occur when the conduction rate is greatly increased at the small mean conduction rate of the output transistor 8. On the other hand, undesirable vibration of the engine 3 does not occur even when the conduction rate is greatly increased at a large mean conduction rate of the output transistor 8. The above fact has been experimentally confirmed.

Thus, according to the second embodiment, when the mean conduction rate is large, the conduction rate of the output transistor 8 can be greatly increased so that the length of time required for gradually increasing the field current of the generator 1 can be shortened to minimize the voltage drop of the battery 2.

Figure 8:
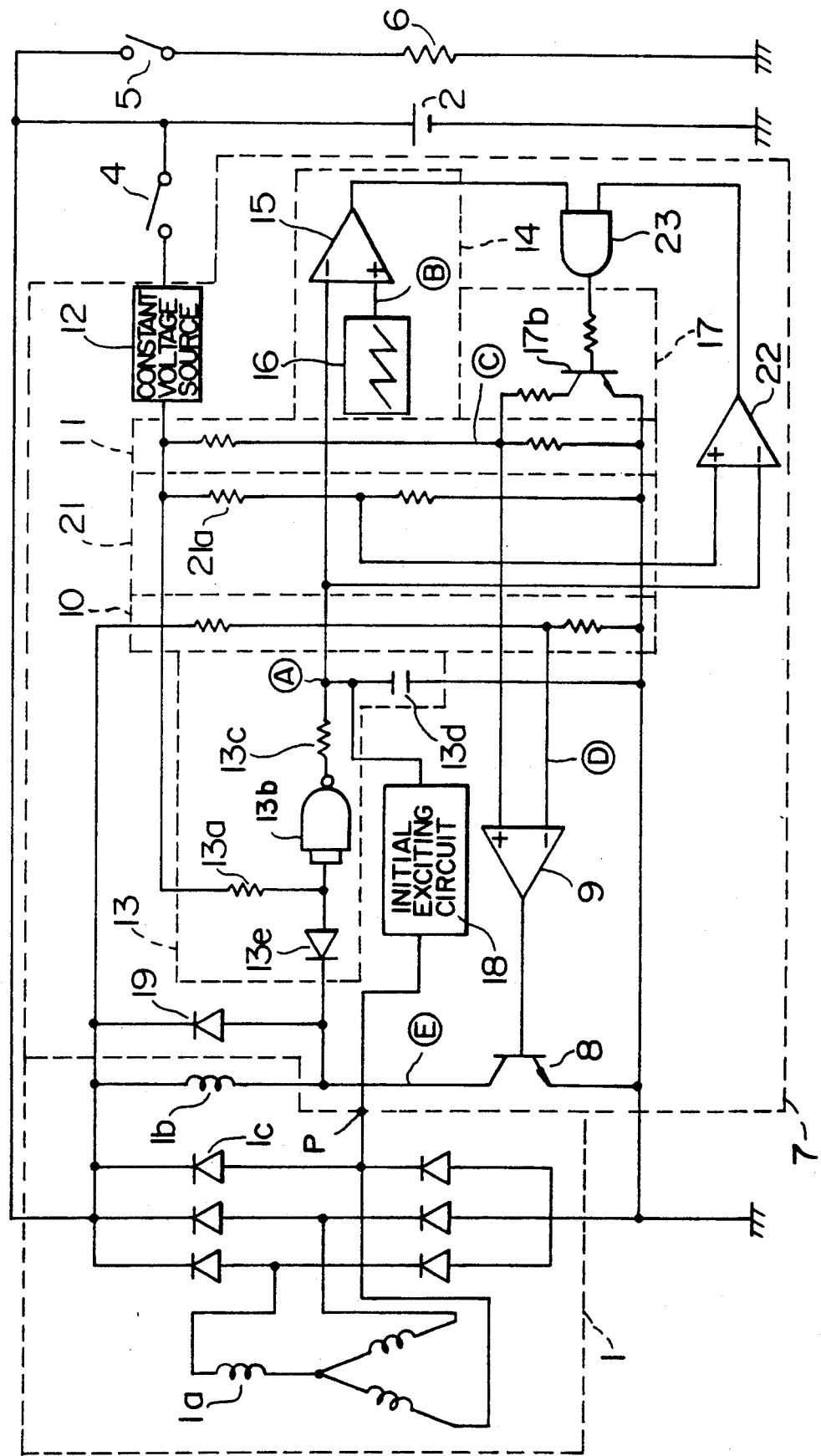
FIGS. 8 and 9 are electrical circuit diagrams of a third and a fourth embodiment of the present invention respectively.

FIG. 8 shows a third embodiment which is another modification of the first embodiment shown, in FIG. 1. This third embodiment further includes a control circuit including a second reference voltage circuit 21, a comparator 22 and an AND gate 23 for enabling comparator 9 by restricting the operation of the enabling control circuit 17 when the value of the output signal of the mean conduction rate detecting circuit 3 exceeds a preset value. The second reference voltage circuit 21 includes resistors 21a and 21b. The AND gate 23 is connected at one of two input terminals to the output terminal of the comparator 15 in the maximum signal generating circuit 14 and at the other input terminal to the output terminal of the comparator 22.

In this third embodiment, an output signal of low level is generated from the comparator 22 and applied to the AND gate 23 when the mean conduction rate detected by the mean conduction rate detection circuit 13 exceeds 80%. That is, when the mean conduction rate of the output transistor 8 exceeds 80%, the output signal of the AND gate 23 acts to turn off the transistor 17b in the enable control circuit 17.

Therefore, when the electrical load 6 is connected to the generator 1, and the conduction rate of the output transistor 8 increases gradually until the mean conduction rate exceeds 80%, the conduction rate of the output transistor 8 increases sharply up to 100% as shown by the broken curve in FIG. 5. Thus, the length of time required for gradually increasing the conduction rate up to 100% can be shortened, and insufficient charging of the battery 2 can be compensated.

In the third embodiment too, the sharp increase of the mean conduction rate from 80% to 100% as described above does not especially adversely affect the operation of the engine 3 because the torque of the engine 3 is large already.

Figure 9:
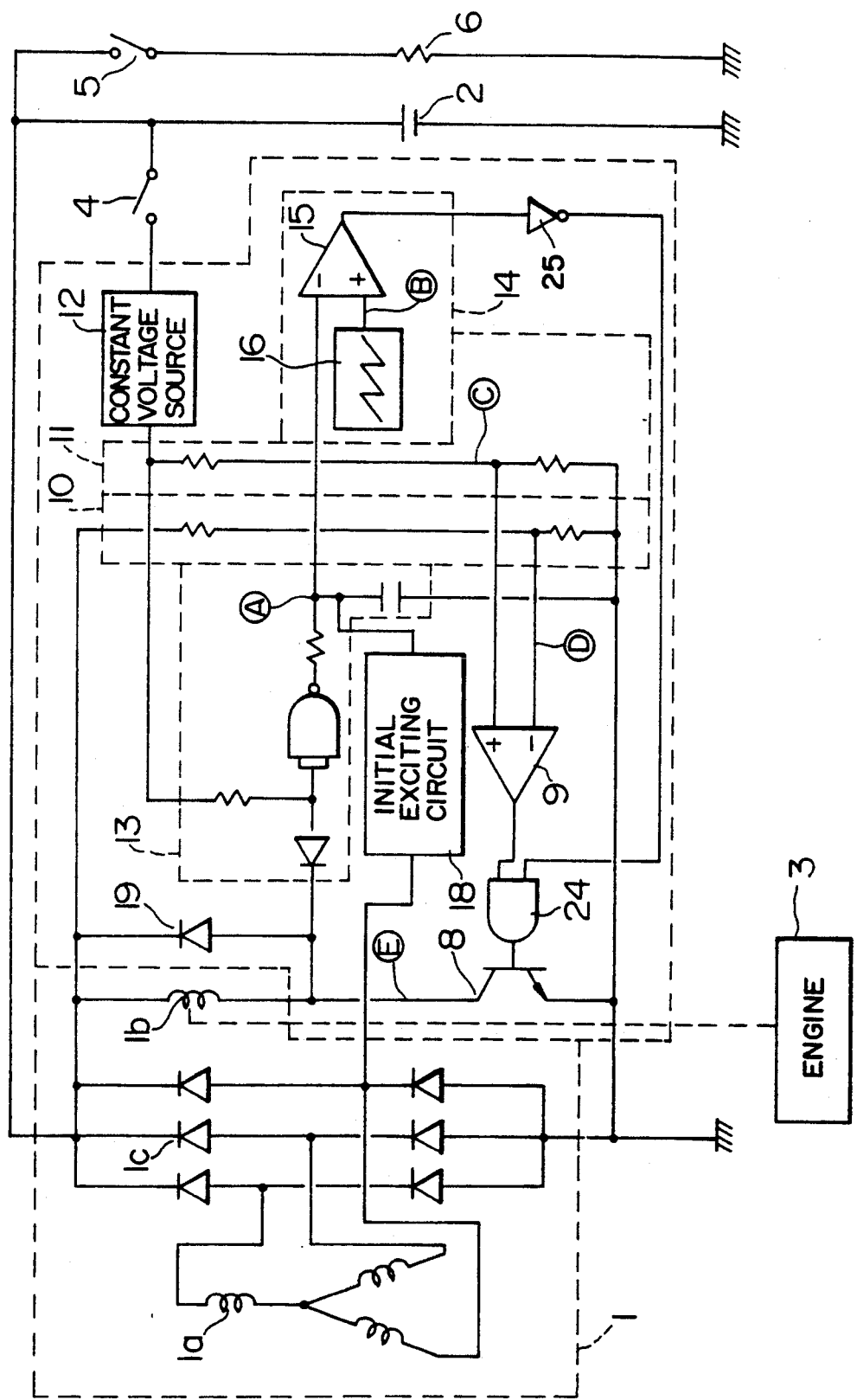

FIG. 9 shows a fourth embodiment of the present invention. This fourth embodiment is also a modification of the first embodiment shown in FIG. 1, and an AND gate 24 is connected between the output transistor 8 and the comparator 9. This AND gate 24 is connected at one of its input terminals to the output terminal of the comparator 9 and at the other input terminal to the output terminal of the maximum signal generating circuit 14 through an inverter 25.

In the aforementioned first, second and third embodiments, the transistor 17b acts to change the potential at the point Ⓒ depending on the value of the output of the maximum signal generating circuit 14. The fourth embodiment differs from those embodiments in that the output transistor 8 is turned on when both the comparator 9 and the inverter 25 generate output signals of high level.

Figure 10:
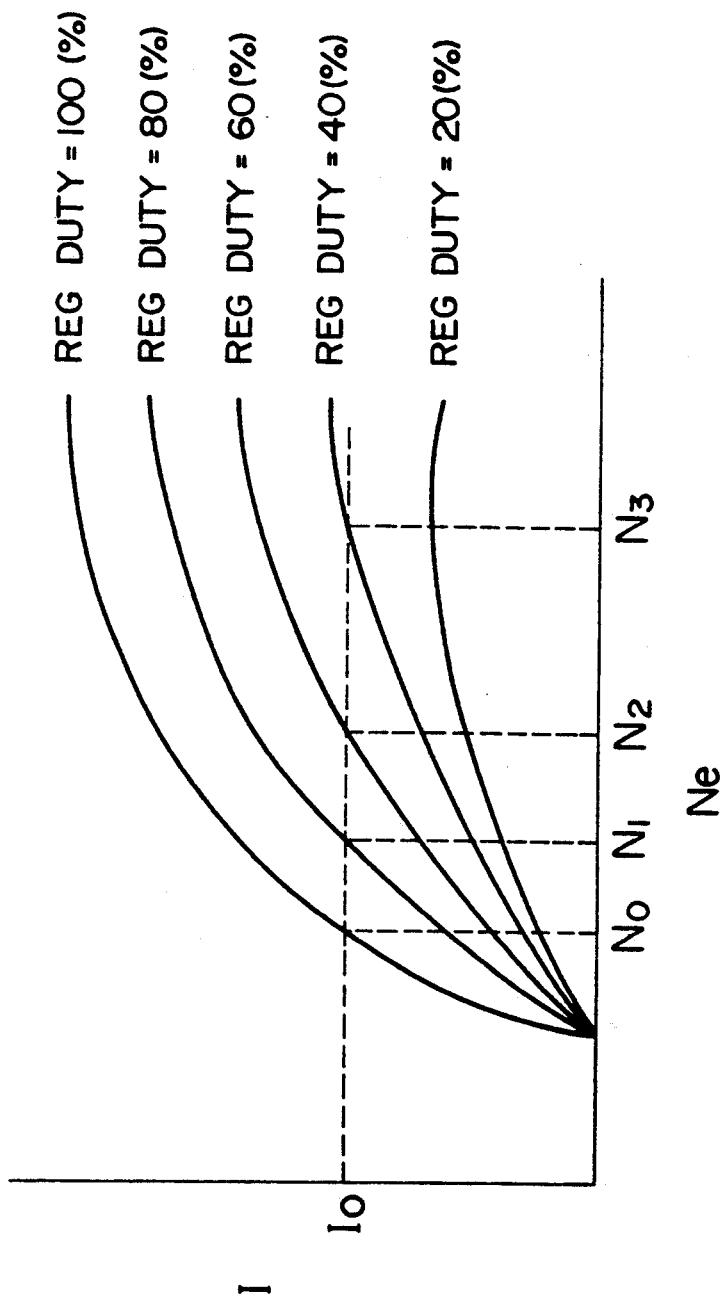
FIG. 10 shows the relation between the rotation speed of the engine and output-current of the alternator.

As seen from the aforementioned first, second, third and fourth embodiments, an improved characteristic concerning the relation between the rotational speed engine and the output-current of the alternator may be effected. Therefore, stalling of the engine may be eliminated. In FIG. 10, Ne and I denotes the rotational speed of the engine and the output-current of the alternator, respectively.

When the engine is in a racing condition, the revolutions Ne increase, for example, through $N_0 \rightarrow N_1 \rightarrow N_2 \rightarrow N_3$; then the regulator changes the duty thereby to output constant $I_0$. Next, as the Ne decreases, for example, through $N_3 \rightarrow N_2 \rightarrow N_1 \rightarrow N_0$; the increase of the duty is detected based on the duty in case "Ne=$N_3$" and then the duty is increased gradually after the $\Delta$ duty increases. Therefore, the output-current of the alternator is less than $I_0$. As a result, an undesirable state of the engine may be eliminated.

A fifth embodiment will now be explained below.

Figure 11:
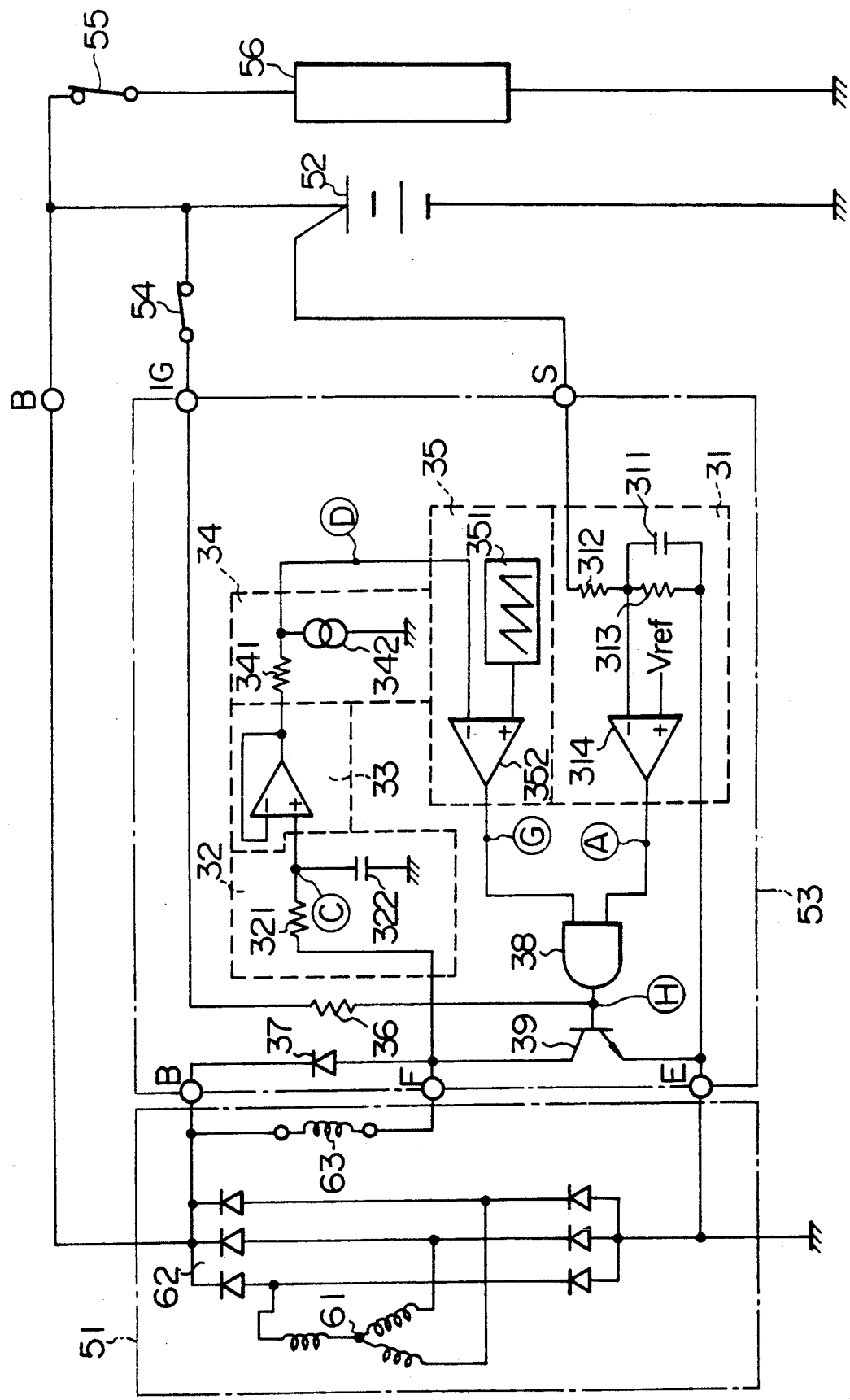
FIG. 11 is an electrical circuit diagram showing a fifth embodiment of the apparatus according to the present invention.

In FIG. 11, numeral 51 designates an AC generator for the vehicle. This generator 51 includes a three-phase stator winding 61 in Y connection, a field winding 63 rotationally driven by an engine not shown, and a rectifier 62 for full-wave rectifying the AC output applied to the stator winding 61. The generator 51 is driven by the engine through belt and pulley as well known.

Numeral 52 designates a battery, one end of which is connected to the full-wave rectifier 62. Numeral 54 designates a key switch, and numeral 55 a change-over switch for connecting and electrical load 56 to the battery 52.

Numeral 53 designates a control circuit for controlling the field current flowing in the field winding 63 of the generator 51. This control circuit 53 is assembled on the AC generator 51 for the vehicle as well known from U.S. Pat. No. 3,538,361 and No. 4,419,597.

Now, the control circuit 53 will be explained in detail.

A voltage control circuit 31 includes a comparator 314, a first resistor 312 connected to the plus (+) terminal of the battery 52, and a parallel circuit of a second resistor 313 and a capacitor 311.

The minus (−) input of the comparator 314, on the other hand, is connected between the first and second resistors 312 and 313, while the plus (+) input thereof is supplied with a reference voltage Vref. This voltage control circuit 31 is set to produce a low-level output when the battery voltage $V_S$ is as high or higher than $V_H$, and a high-level output when the battery voltage drops down to or is lower than $V_L$.

Numeral 32 designates a mean conduction rate detection circuit inserted between the field winding 63 and an output transistor 39. This detection circuit includes a third resistor 321 and a capacitor 322 with an end thereof grounded. The charging voltage of this capacitor 322 of the detection circuit 32 is discharged through the third resistor 321 as the voltage in level between the field winding 63 and the output transistor 39 becomes low while the output transistor 39 is conducting.

When the output transistor 39 is turned off, by contrast, the voltage between the field winding 63 and the output transistor 39 becomes high in level, so that the capacitor 322 is charged through the third resistor 321 by current from field winding 63.

The third resistor 321 is set to approximately one M$\Omega$, the capacitor 322 to approximately 0.2 $\mu$F, and the time constant due to the third resistor 321 and the capacitor 322 to 200 msec. Also, the charging voltage of the capacitor 322, which corresponds to the voltage of a triangular wave generation circuit 351 described later, is adapted to have the same 4 V as the peak value of the triangular wave voltage when fully charged, and the same 0 V as the bottom value of the triangular wave voltage when fully discharged.

As a result, the voltage charged to the capacitor 322 is detected as a mean conduction rate of the output transistor 39 by charging and discharging of the capacitor 322 due to the turning on and off of the output transistor 39 during the period of about 200 msec. Specifically, the charging voltage of the capacitor 322 undergoes a change in the range from 0 V to 4 V which voltages correspond to the mean conduction rates of 100% to 0% respectively.

Numeral 33 designates an impedance converter circuit including a voltage follower for detecting the voltage across the capacitor 322 accurately and producing the same as an output.

Numeral 34 designates a voltage-reducing circuit for adding a predetermined value to the detection value of the mean conduction rate detection circuit 32. This voltage-reducing circuit 34 includes a fourth resistor 341 and a constant-current circuit 342. With the resistor 341 set to about 4 K$\Omega$ and the constant current to 100 $\mu$A, the amount of voltage reduction in this circuit 34 is approximately 0.4 V equivalent to a conduction rate of 10%.

Numeral 35 designates a maximum signal generating circuit including a comparator 352 and a triangular wave generating circuit 351. The minus (−) input of this comparator 352 is connected to the output of the voltage-reducing circuit 34, and the plus (+) input thereof to the triangular wave generating circuit 351.

The triangular wave generating circuit 351 generates a triangular wave having a peak value of 4 V, a bottom value of 0 V and a period T of about 20 msec.

When the mean conduction rate of the output transistor 39 is 50% in the aforementioned configuration, the charging voltage of the capacitor 322 of the mean conduction rate detection circuit 32 is 2 V. That output voltage as detected by circuit 33 is reduced 0.4 V by the voltage-reducing circuit 34 to 1.6 V. Then the maximum signal generating circuit 35, by comparing the output voltage of 1.6 V with a triangular wave at the comparator 352, determines the maximum time that the triangular wave exceeds that output voltage and produces an output signal (pulse) having a duty factor of 60% and the same period of 20 msec as the triangular wave. Specifically, as compared with the 50% duty factor D of the output transistor 39, the output signal of the maximum signal generating circuit 35 has a 60% duty factor of D +$\alpha$ where $\alpha$ is 10%, the amount the charging voltage is reduced by circuit 34.

Numeral 38 designates an AND circuit supplied with an output of the comparator 314 of the voltage control circuit 31 and an output of the comparator 352 of the maximum signal generating circuit 35.

Numeral 39 designates an output transistor for turning on and off the current flowing in the field winding 13 in accordance with the output of the AND circuit 38.

The operation of the FIG. 11 circuit is now be explained.

Figure 12:
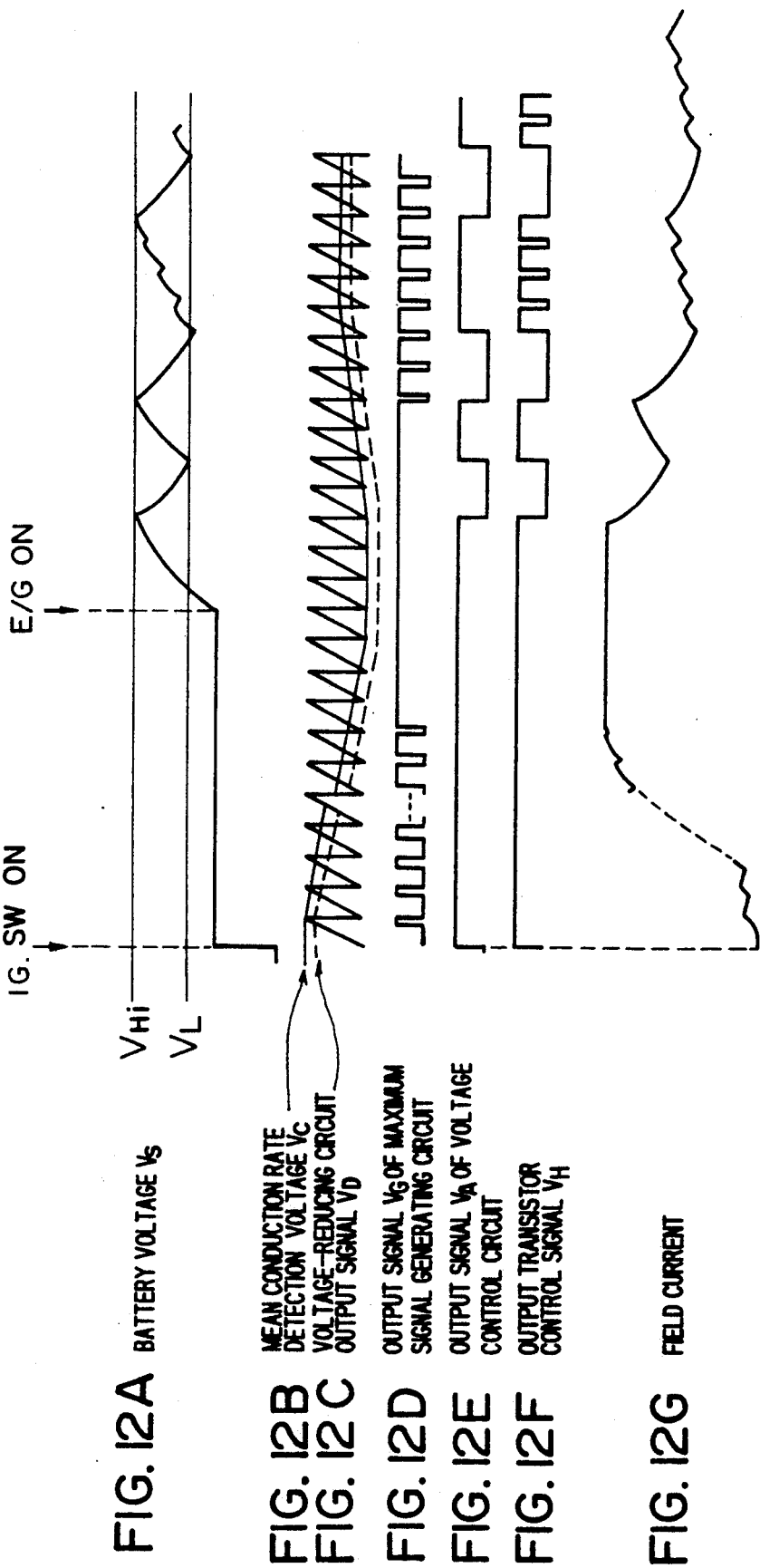
FIGS. 12 to 15 show waveforms of voltages or signals produced at various points in the circuit in respective states.

Reference is had to the operation of starting the engine on the basis of FIG. 12.

First, when the key switch 54 is turned on but the engine not started, the generator 51 has not yet generated power and the capacitor voltage $V_c$ at the point (C) of the mean conduction rate detection circuit 32 shown in FIG. 11 is charged to 4 V because of its direct connection to the battery through the field coil 63, so that the output voltage of the voltage-reducing circuit 34 is 3.6 V which is lower than $V_c$ by 0.4 V. As a result, the output signal $V_G$ of the maximum signal generating circuit 35 is an on-off control signal having a duty factor of 10% and a period of about 20 msec. Before the engine is started, on the other hand, the output $V_A$ of the voltage control circuit 31 takes the form of a "high" signal by the comparator 314 since the battery voltage $V_S$ (FIG. 12A) is lower than the reference voltage $V_L$.

The output transistor 39, however, is controlled by the signal $V_G$ (duty factor of 10%) of the maximum signal generating circuit 32 through the AND circuit 38. Only when voltages $V_A$ and $V_G$ are both high after the key switch 54 is closed, does AND circuit 38 produce a high level output to trigger output transistor on.

In view of the fact that the output transistor 39 is controlled with the duty factor of 10%, the capacitor 322 of the mean conduction rate detection circuit 32 is alternately charged discharged and hence voltage $V_C$ is reduced slowly (FIG. 12B) with the turning on and off of the output transistor 39. Consequently, the output voltage $V_D$ of the voltage-reducing circuit 34 also decreases gradually (FIG. 12C), and therefore the duration of the positive-going pulses of the output signal $V_G$ of the maximum signal generating circuit 35 steadily increases as shown in FIG. 12D. The conduction rate of the output transistor 39 thus increases, thereby causing the field current to increase slowly as shown in FIG. 12G.

The operation of the generator 51 starting to generate power after the engine (E/G) starts will now be explained with reference to FIG. 12. Before engine starts, the control signal $V_H$ of the output transistor 39 is 100% in the on state. When the engine starts and the engine speed increases, therefore, the output of the generator 51 increases to increase the battery voltage. When the battery voltage $V_S$ reaches an upper limit $V_{Hi}$ the control voltage, the output $V_A$ of the voltage control circuit 31 switches from "high" to "low" level, thus turning off the output transistor 39. Until then the output transistor 39 was kept on from the moment output signal $V_D$ went below the triangular wave causing voltage $V_G$ to become high while voltage $V_A$ remained a high. Therefore capacitor 322 is now fully discharged and consequently the mean conduction rate detection voltage $V_C$ is completely reduced to 0 V. Thus the output $V_G$ of the maximum signal generation circuit 35 is produced as a 100%-ON signal.

After the turning off of the output transistor 39, on the other hand, the battery voltage $V_S$ drops at a rate determined by the capacity of the battery 52 and the electrical load 56. Until the low limit $V_L$ is reached, the output of the voltage control circuit 31 keeps the output transistor 39 off and the field current continues to decrease. When $V_S$ is reduced below $V_L$, the output of the voltage control circuit switches from "low" to "high" level, so that the output transistor 39 turns on again.

Consequently the output transistor 39 is controlled in such a manner that the battery voltage $V_S$ is maintained between the upper limit $V_{Hi}$ and the lower limit $V_L$.

Figure 13:
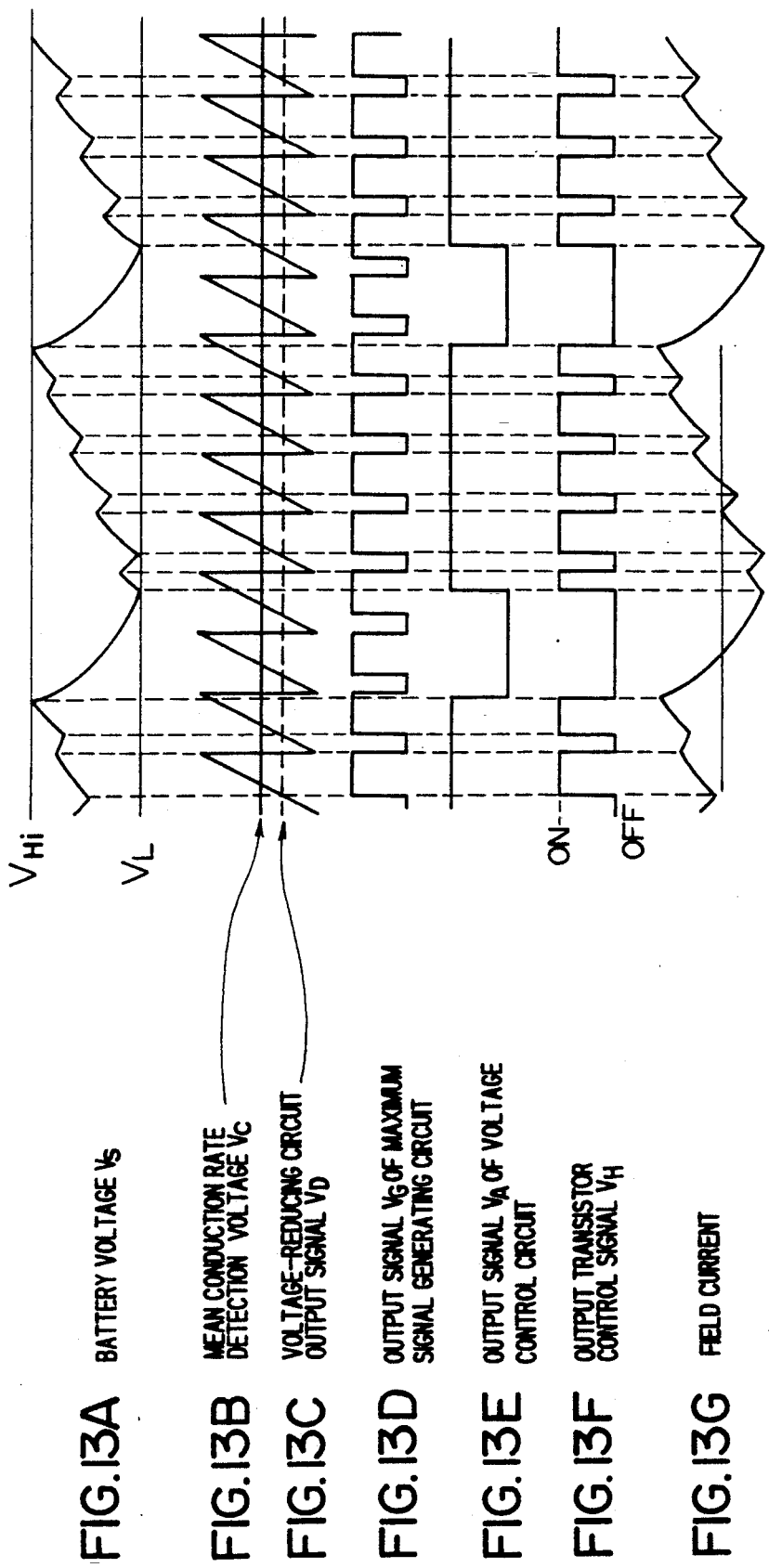

The operation under a fixed load condition and a constant engine speed will now be explained with reference to FIG. 13. In FIG. 13, assume that the conduction rate of the output transistor 39 remains stable at about 70%.

Under this condition, the detection voltage $V_C$ of the mean conduction rate detecting circuit 32 is 1.2 V which is equivalent to the conduction rate of 70%, and the output voltage $V_D$ of the voltage-reducing circuit 34 stands at 0.8 V. As a result, the output signal $V_G$ of the maximum signal generating circuit 35 is produced with a period of 20 msec and a duty factor of 80% as shown in FIG. 13(D).

The voltage control circuit 31, on the other hand, produces a "high" signal $V_A$ (FIG. 13E) when the battery voltage $V_S$ (FIG. 13A) drops below the lower limit $V_L$. This "high" signal and the output signal $V_G$ are applied to an AND circuit 38, whereby the output transistor 39 is turned on and off in accordance with the $V_H$ 80% duty factor of control signal $VL_H$ shown in FIG. 13(F).

The battery volta $V_S$, as shown in FIG. 13(A), increases stepwise from the lower limit $V_L$, and when the upper limit $V_{Hi}$ is reached, drops with a predetermined time constant. The battery voltage $V_S$ is thus maintained between the upper limit $V_{Hi}$ and the lower limit $V_L$.

Figure 14:
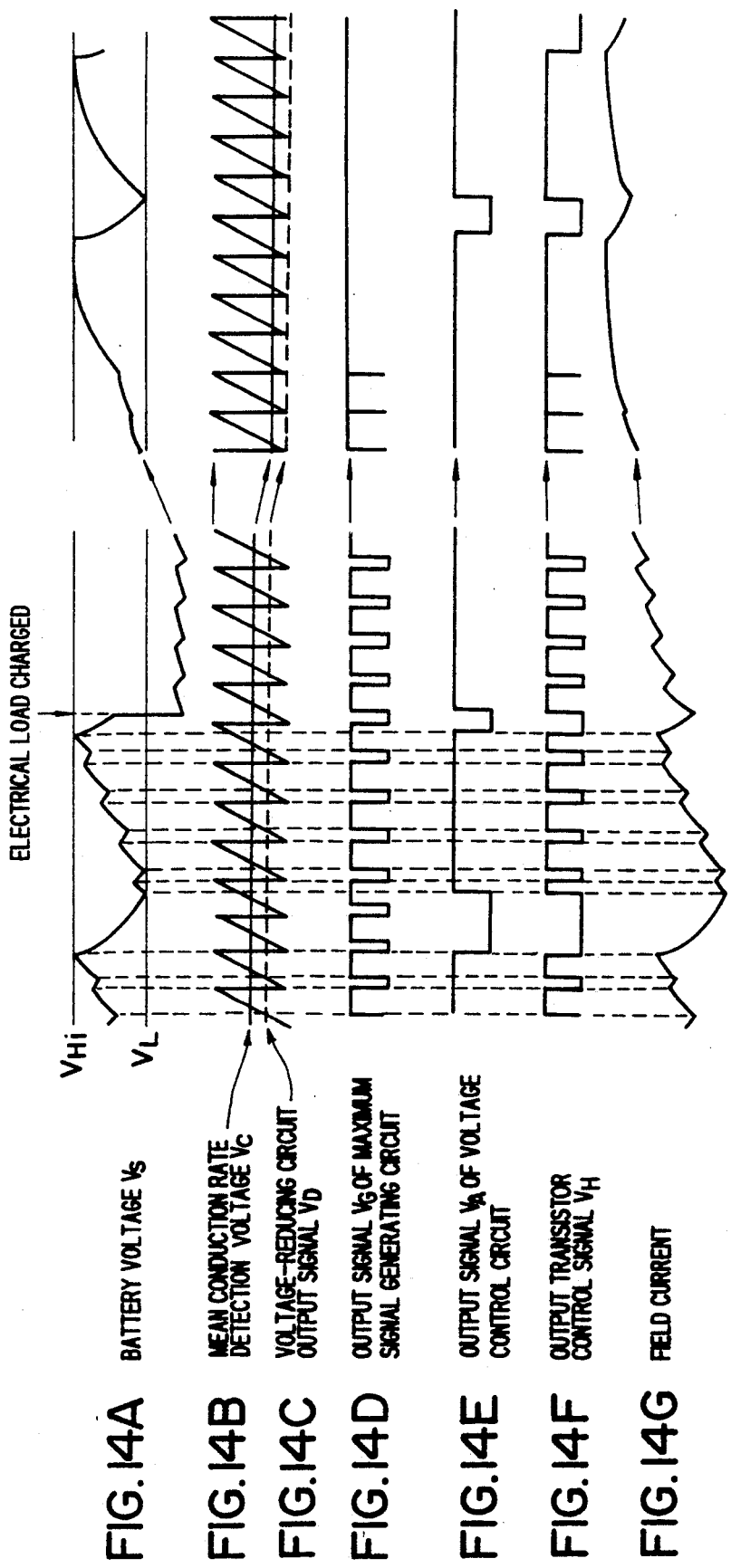

Now, the operation with the electrical load 56 applied in the aforementioned stable state will be explained with reference to FIG. 14.

Under the stable state (with the mean conduction rate of 60%), the output signal $V_G$ of the maximum signal generating circuit 35 takes the form of a signal $V_G$ with the duty factor of 70% as shown in FIG. 14(D).

Assuming that a larger electrical load 56 is applied, the battery voltage $V_S$ cannot be compensated only by the output of the generator 51 as shown in FIG. 14(A), and therefore drops to a level below the lower limit $V_L$. As a result, the output signal $V_A$ of the voltage control circuit 31 continues to be produced as a "high" signal as shown in FIG. 14(E).

As compared with the preceding conduction rate of 60%, therefore, the logic product of the output signal $V_A$ and the output signal $V_G$ causes the output transistor 39 to be controlled with the duty factor of 70% as shown in FIG. 14(F).

Because the output transistor 39 is controlled by the duty factor of 70%, the mean conduction rate detection circuit 32 that has thus far had a voltage $V_C$ corresponding to the duty factor of 60% has the output thereof $V_C$ decreased gradually by the charging and discharging under the new 70% duty the factor of the output transistor 39 and the time constant of 200 msec due to the third resistor 321 and the capacitor 322.

As the same time, the output voltage $V_D$ of the voltage-reducing circuit 34 gradually drops from the output voltage level $V_C$ less 0.4 V.

As a consequence, the duty factor of the output signal $V_G$ of the maximum signal generating circuit 35 gradually increases from 70% as shown in FIG. 14(D) with the decrease in the output voltage $V_D$ of the voltage-reducing circuit 34, thus increasing the duty factor of the output transistor 39 steadily.

In response to the increase in the duty factor of the output transistor 39, the output voltage $V_C$ of the mean conduction rate detection circuit 32 also decreases gradually with the result that as mentioned above, the control signal $V_H$ of the output transistor 39 steadily increases in duty factor from 70% to 100% as shown in FIG. 14(F).

In view of the fact that the conduction rate (field current) of the output transistor 39 does not increase sharply but gradually when the electrical load 56 is applied, the generator load is also exerted gradually on the engine. In other words, engine vibration or stalling which otherwise might be caused by a sharp application of the electrical load is prevented.

In the case of a sudden decrease in engine speed, on the other hand, the air-fuel mixture deteriorates, the fuel is cut, and the load on the generator is increased by an increased field current to reduce the battery voltage with the decrease, in engine speed. All these adverse effects normally combine to cause an engine to stall easily but not with this invention.

Figure 15:
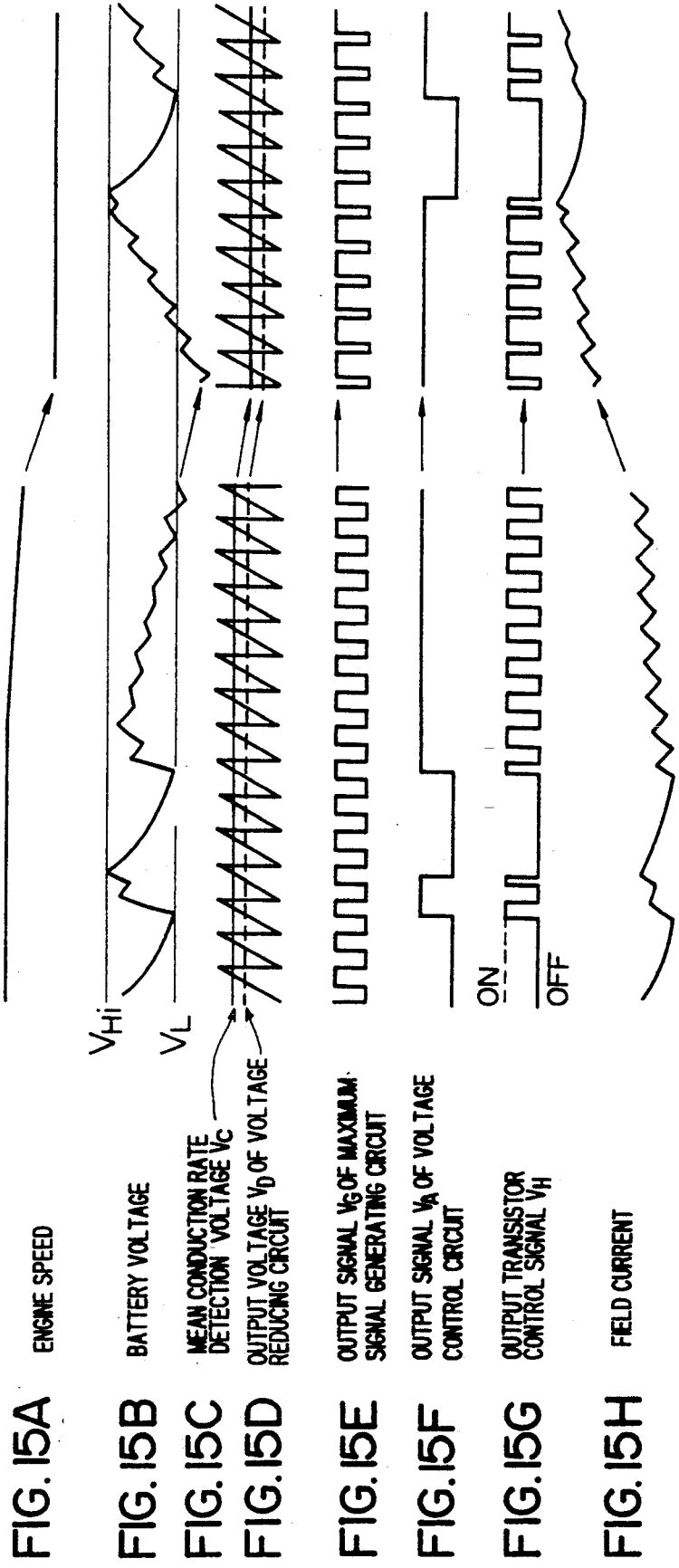

The operation with a decreased engine speed, therefore, will be explained with reference to FIG. 15. As explained above with the decrease in engine speed, the output voltage of the generator 51 drops, and as shown in FIG. 15(B), the battery voltage $V_S$ fails to increase up to the upper limit $V_{Hi}$.

As a result, the output signal $V_A$ of the voltage control circuit 31 continues to be produced as a high-level signal as shown in FIG. 15(F).

As compared with the fixed conduction rate of 40% of the output transistor 39 before the decrease in engine speed, the decrease in engine speed and the high-level output signal $V_A$ cause the output transistor 39 to be controlled to the duty factor of 50% of the maximum signal generating circuit 35 as shown in FIG. 15(G).

The output voltage $V_C$ and $V_D$ of the mean conduction rate detection circuit 32 and the voltage-reducing circuit 34 are gradually decreased as mentioned above, and at the same time the duty factor of the output signal $V_G$ of the maximum signal generating circuit 35 steadily increases, thereby increasing the field current gradually.

When the engine speed settles down to such a value that the conduction rate of the output transistor 39 is dependent on the engine speed and the electrical load, the stable state shown in FIG. 13 is attained.

Figure 16:
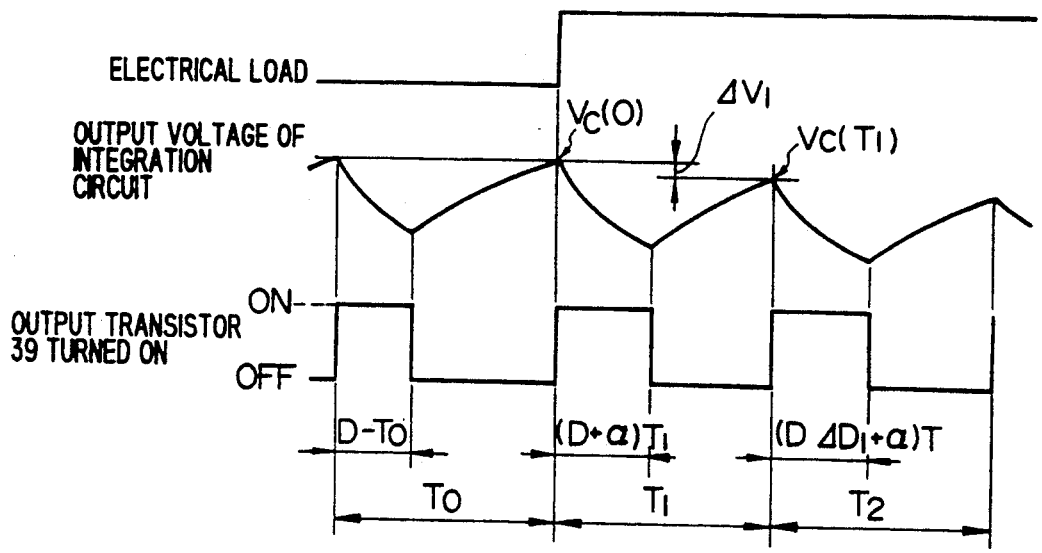
FIG. 16 shows waveforms representing stages of an output voltage of the integration circuit according to the present invention when an electrical load is applied thereto.
Figure 17:
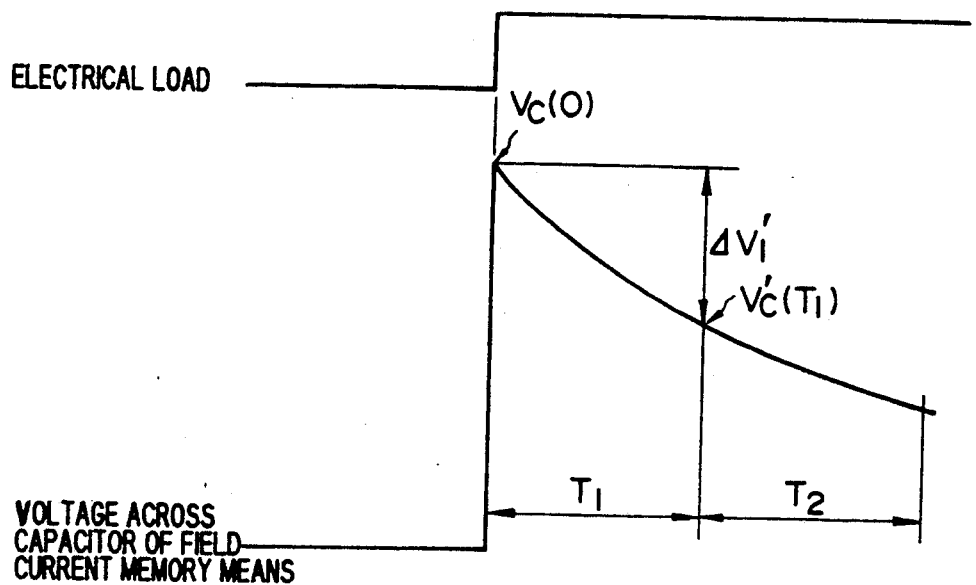
FIG. 17 is a diagram showing waveforms representing the stages of an output voltage of a conventional integration circuit with an electrical load applied thereto.

Explanation will be made with reference to FIGS. 16 and 17 about the fact that the capacitance of the capacitor 322 of the mean conduction rate detection circuit 32 may be reduced according to the present invention. FIG. 16 is a diagram showing a change in capacitor voltage of the mean conduction rate detection circuit 32 according to the present invention, and FIG. 17 shows a change in capacitor voltage of a conventional means conduction rate detection circuit.

Consider the case in which an integration circuit including a resistor 321 and a capacitor 322 is charged and discharged between $V_{CC}$ and GND respectively, assuming that the switch conduction rate gradually increases from D%, $V_{CC}$ being the fully charged voltage across capacitor 322.

In FIG. 16, the voltage $V_C(t)$ of the capacitor 322 immediately after a load is applied is given as $$V_C(t) = V_C(0) = \frac{V_{cc}(100 - D)}{100} \quad (1)$$

The conduction rate allowable after load application is $D + \alpha$ ($\alpha$: Predetermined amount added), and therefore the switch-on time is expressed as $$t_{ON} = \frac{(D + \alpha)}{100} T_1.$$

After the lapse of time $t_{ON}$ following the load application, $V_C(t)$ is $$V_C(t_{on}) = V_C(0) e^{\frac{-t_{ON}}{CR}}; t_{ON} = (D + \alpha)T_1 \quad (2)$$

where CR is the product of the capacitor and resistor values and $T_1$ is the period of generation of the triangular wave generation circuit 351.

The voltage $V_C(t)$ after the lapse of time $T_1$ following the load application is expressed as $$V_C(T_1) = V_{CC} - (V_{CC} - V_C(t_{ON})) e^{\frac{-(T_1 - T_{ON})}{CR}} \quad (3)$$

From equations (1), (2) and (3), the amount of reduction $\Delta V_1$ in $V_C$ after the lapse of the time $T_1$ following the load application is determined as follows:

$$\Delta V_1 = V_C(0) - V_C(T_1) = \frac{V_{CC} \cdot T_1 \cdot \alpha}{CR \cdot 100} \quad (4)$$

In similar fashion, in the conventional simple discharge system with a capacitor and a resistor shown in FIG. 17, the amount of reduction $\Delta V_1$ of $V_C$ after the lapse of time $T_1$ is given as $$\Delta V_1' = V_C(0) - V_C'(T_1) = \frac{V_{CC} \cdot T_1(100 - D)}{CR \cdot 100} \quad (5)$$

From equation (4), it is seen that the amount of reduction in $V_C$ is not dependent on the conduction rate D before the increase but is always proportional to a predetermined amount $\alpha$ and takes a fixed value inversely proportional to CR. It is thus possible to decrease the amount of reduction by decreasing the value $\alpha$.

Equation (5) shows, on the other hand, that in the conventional apparatus, the amount of reduction of $V_C$ is dependent on the conduction rate D before the increase thereof, and the smaller the conduction rate D, the larger the amount of reduction $V_C$ for a predetermined time. Specifically, the conduction rate is determined by the drop in the voltage $V_C$ and a triangular wave, so that the lower the level from which the amount of power generated is increased (with a small conduction rate D), the greater the rate at which the conduction rate is increased for a predetermined time.

At a time when the problem is posed by a sharp increase in the amount of power generated by the generator when the field current is increased from the state of small amount of power generation with a small conduction rate D of the output transistor 39 for automotive vehicles, the conventional apparatuses are such that the smaller the amount of the power generated by the generator, the sharper the increase in the field current, thus making it necessary to increase the size of the capacitor to provide for the worst case as a compensation. After the size of the capacitor is thus increased, if an electrical load is charged with a large conduction rate D of the output transistor 39, a considerable time is required before the conduction rate D reaches 100%, thus causing the battery not to be sufficiently charged.

This problem is eliminated according to the present invention regardless of the conduction rate D since CR is the sole deciding factor.

Further, comparison between equations (4) and (5) shows that if the same amount of reduction in $V_C$ is to be secured, the time constant of $$\frac{\alpha}{1 - D/100} CR$$

is sufficient according to the present invention as compared with the simple CR discharging system for the prior art. If $\alpha$ is reduced, therefore, the time constant can be decreased greatly according to the present invention.

Assume that D ≦ 50% where the necessity is high for controlling the rate of increase in the field current, for example. If α is set to 5%, the capacitance of the capacitor is reduced to one tenth or less of the conventional requirement.

The foregoing description of embodiments of the invention has been presented for purposes of illustration and description and is not intended to be exhaustive or to limit the invention to the precise forms disclosed, since many modifications and variations are possible in light of the above teachings. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

We claim;

1. A charging control apparatus for a vehicle, comprising:
   a vehicle generator, including a stator winding and a field winding, adapted to be driven by an engine to generate an output voltage for charging a battery;
   switching means connected in series with said field winding;
   mean conduction rate detecting means for detecting the mean conduction rate of said switching means to generate an output signal having a value which is a function of the mean conduction rate of said switching means;
   maximum signal generating means connected to said mean rate conduction rate detecting means to receive said output signal thereof and generating a maximum signal having a value larger by a predetermined value than that of the output signal of said mean conduction rate detecting means;
   comparing means connected to receive the output voltage of said vehicle generator as a first input signal for comparing said output voltage with a predetermined reference voltage applied to the comparing means as a second input signal, said comparing means being connected to said switching means for applying thereto an output signal for controlling the operation of said switching means; and
   enable control means connected to said maximum signal generating means to receive the maximum signal therefrom for enabling said comparing means to generate its said output signal depending on the value of the maximum signal generated from said maximum signal generating means.

2. A charging control apparatus according to claim 1, wherein said maximum signal generating means includes a comparator receiving the output signal of said mean conduction rate detecting means as a first signal input thereto and a triangular waveform output signal of a triangular wave generating circuit as a second signal input thereto.

3. A charging control apparatus according to claim 1, wherein said enable control means reduces the predetermined reference voltage to said comparing means to a second predetermined voltage while said maximum signal generating means is generating the maximum signal.

4. A charging control apparatus according to claim 3, wherein said second predetermined reference voltage is a minimum voltage required for preventing complete consumption of the charged voltage of said battery.

5. A charging control apparatus according to claim 2, further comprising control means for enabling said comparing means by restricting the operation of said enable control means when the value of the output signal of said mean conduction rate detecting means exceeds a preset value.

6. A charging control apparatus according to claim 1, wherein said predetermined value in the maximum signal generated from said maximum signal generating means is increased with an increase in the means conduction rate detected by said mean conduction rate detecting means.

7. A charging control apparatus for a vehicle, comprising:
   a vehicle's a.c. generator including a stator winding and a field winding and driven by an engine to charge a battery;
   switching means connected in series with said field winding;
   comparing means connected to said battery to detect a voltage of said battery for comparing the battery voltage with a reference voltage and producing an output signal for controlling on-off of said switching means for regulating an electric current flowing through said field winding for maintaining the battery voltage at a desired value;
   mean conduction rate detecting means connected to said switching means, and including a resistor and a capacitor repeatedly charged and discharged in response to the on-off of said switching means, for detecting the mean conduction rate of said switching means and generating an output signal having a value which is a function of the mean conduction rate of said switching means;
   maximum signal generating means responsive to the output signal of said mean conduction rate detecting means for generating an output signal having an on-duty ratio larger by a predetermined value than the mean conduction rate of said switching means obtained by said mean conduction rate detecting means; and
   enable control means for enabling the operation of said comparison means in response to the output signal of said maximum signal generating means.

8. A charging control apparatus according to claim 7, wherein said maximum signal generating means includes a comparator receiving the voltage of said capacitor is said mean conduction rate detecting means as a first input signal thereto and a triangular waveform output voltage of a triangular wave generating circuit as a second input signal thereto, and said comparator generates a rectangular waveform output signal having said on-duty ratio larger by the predetermined value than the mean conduction rate of said switching means.

* * * * *